Figure 1A:
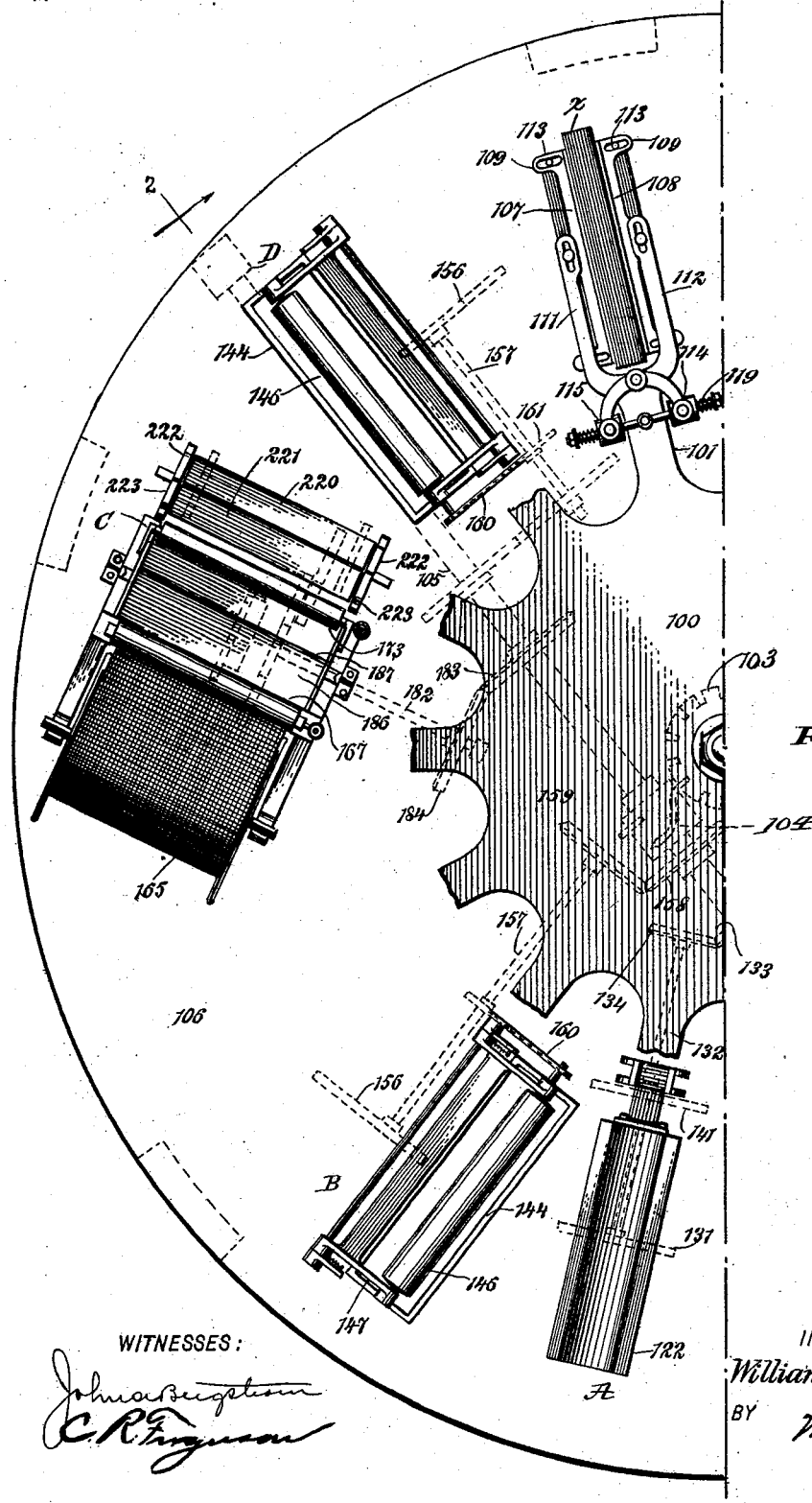

No. 715,540. Patented Dec. 9, 1902.
W. E. BLAUVELT.
BOOKBINDING MACHINE.
(Application filed Nov. 27, 1901.)
(No Model.) 30 Sheets—Sheet 1.

WITNESSES:

INVENTOR
William E. Blauvelt
BY
ATTORNEYS

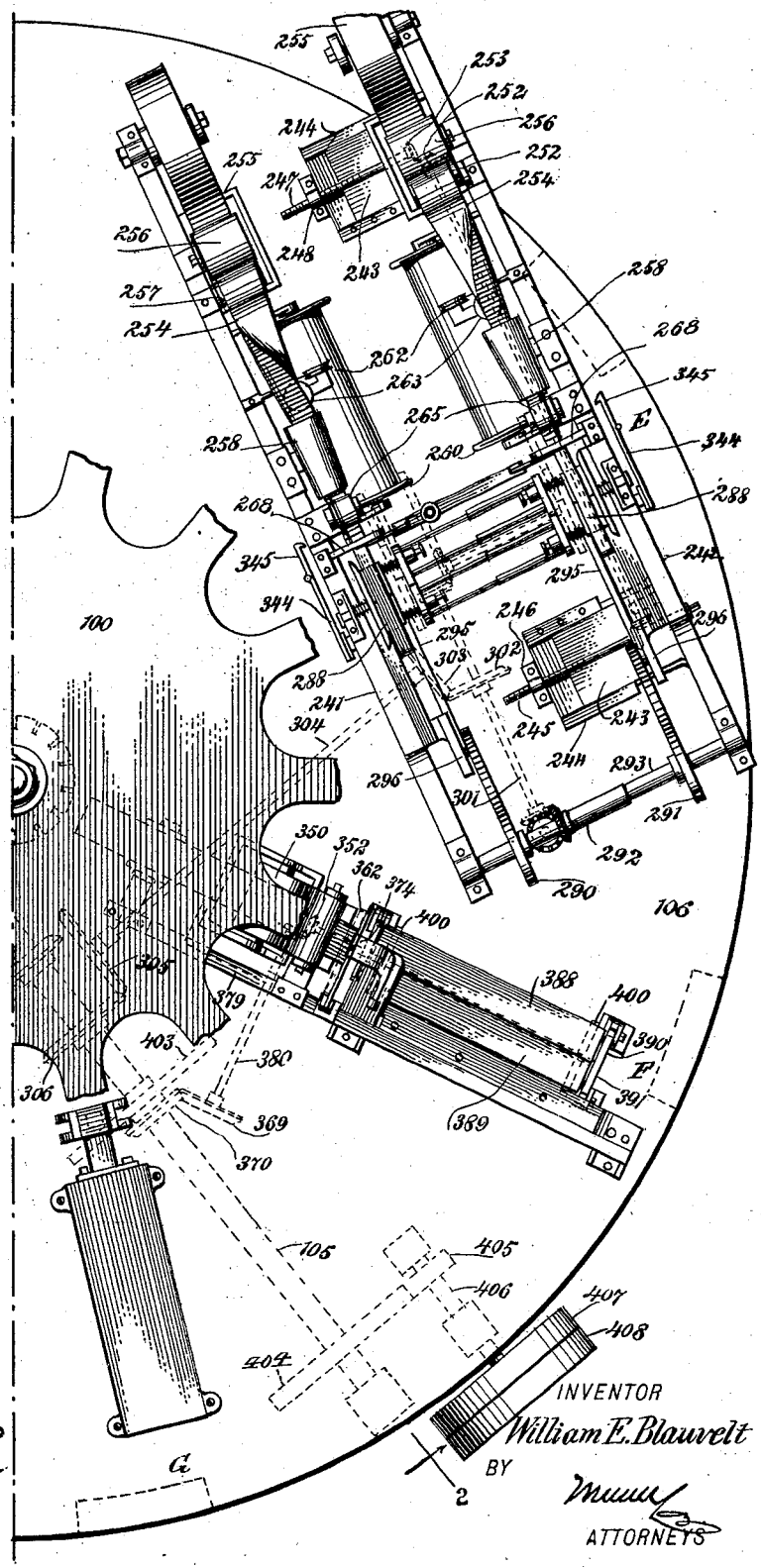

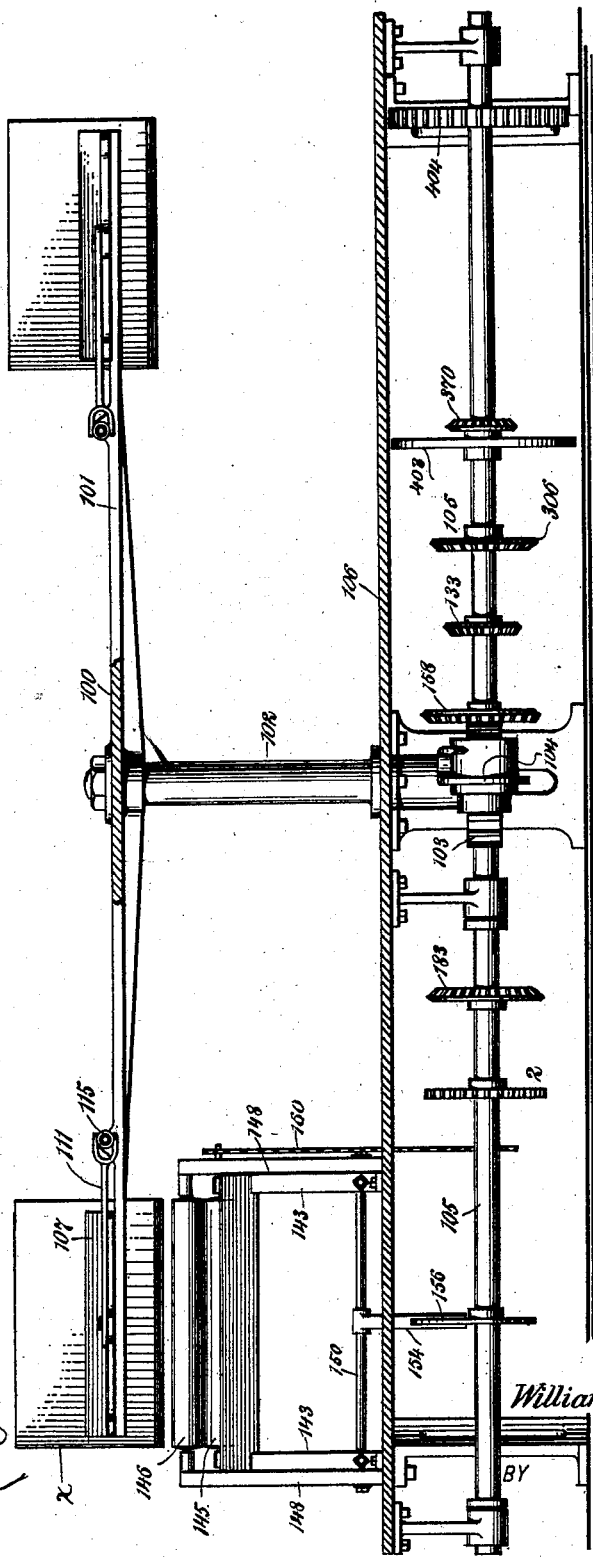

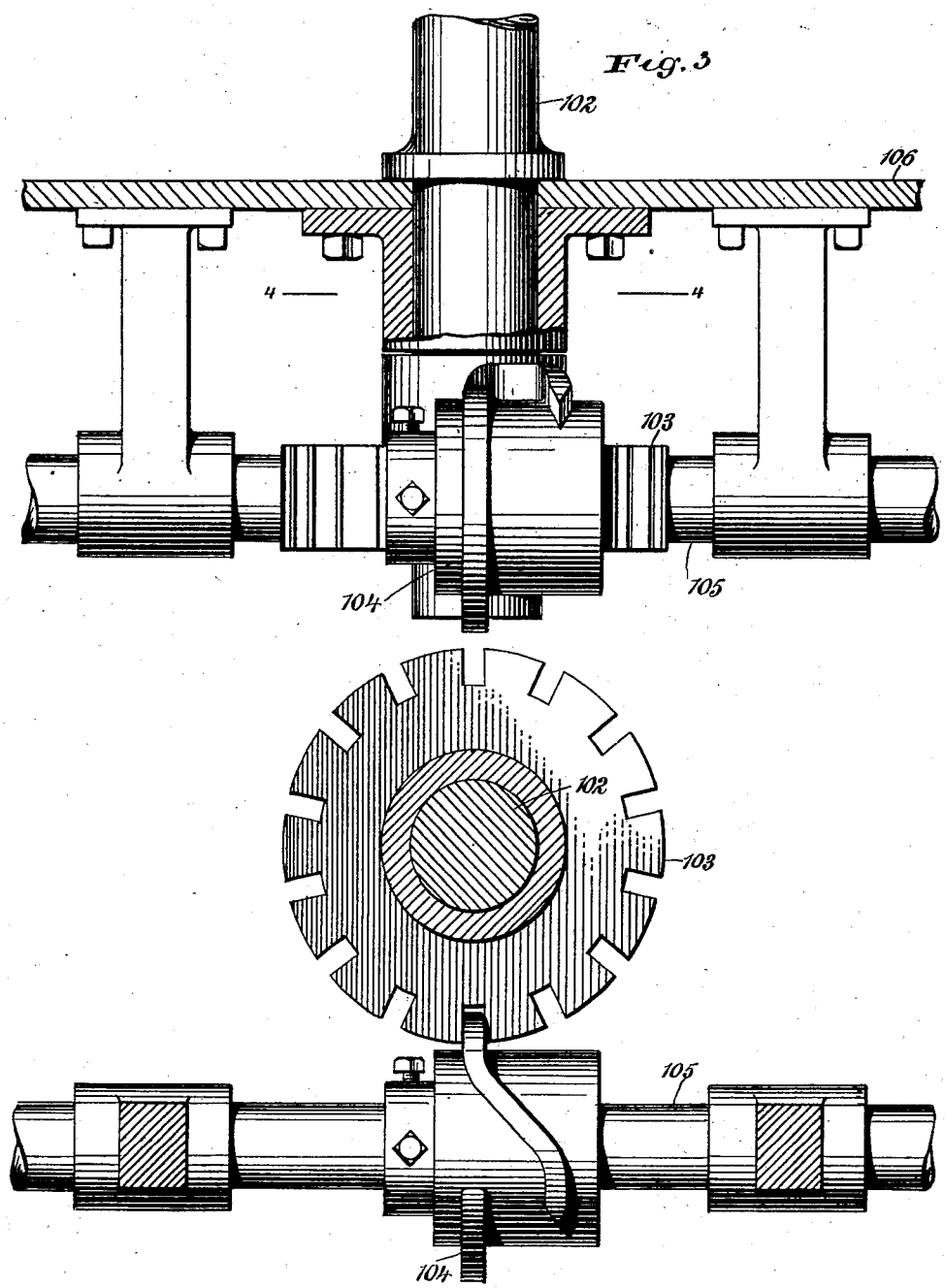

No. 715,540. Patented Dec. 9, 1902.
W. E. BLAUVELT.
BOOKBINDING MACHINE.
(Application filed Nov. 27, 1901.)
(No Model.) 30 Sheets—Sheet 5.
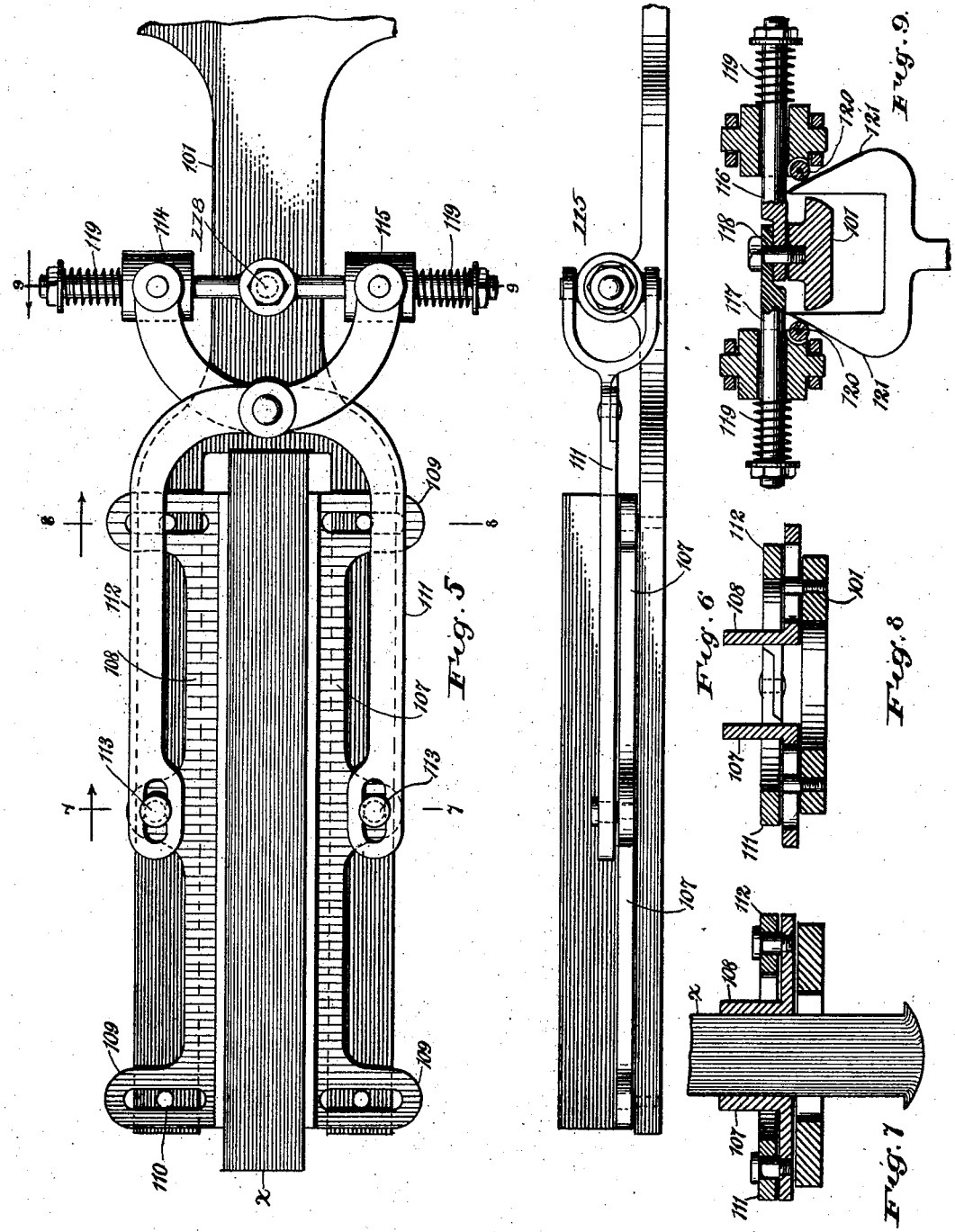
WITNESSES:
INVENTOR
William E. Blauvelt
BY
ATTORNEYS

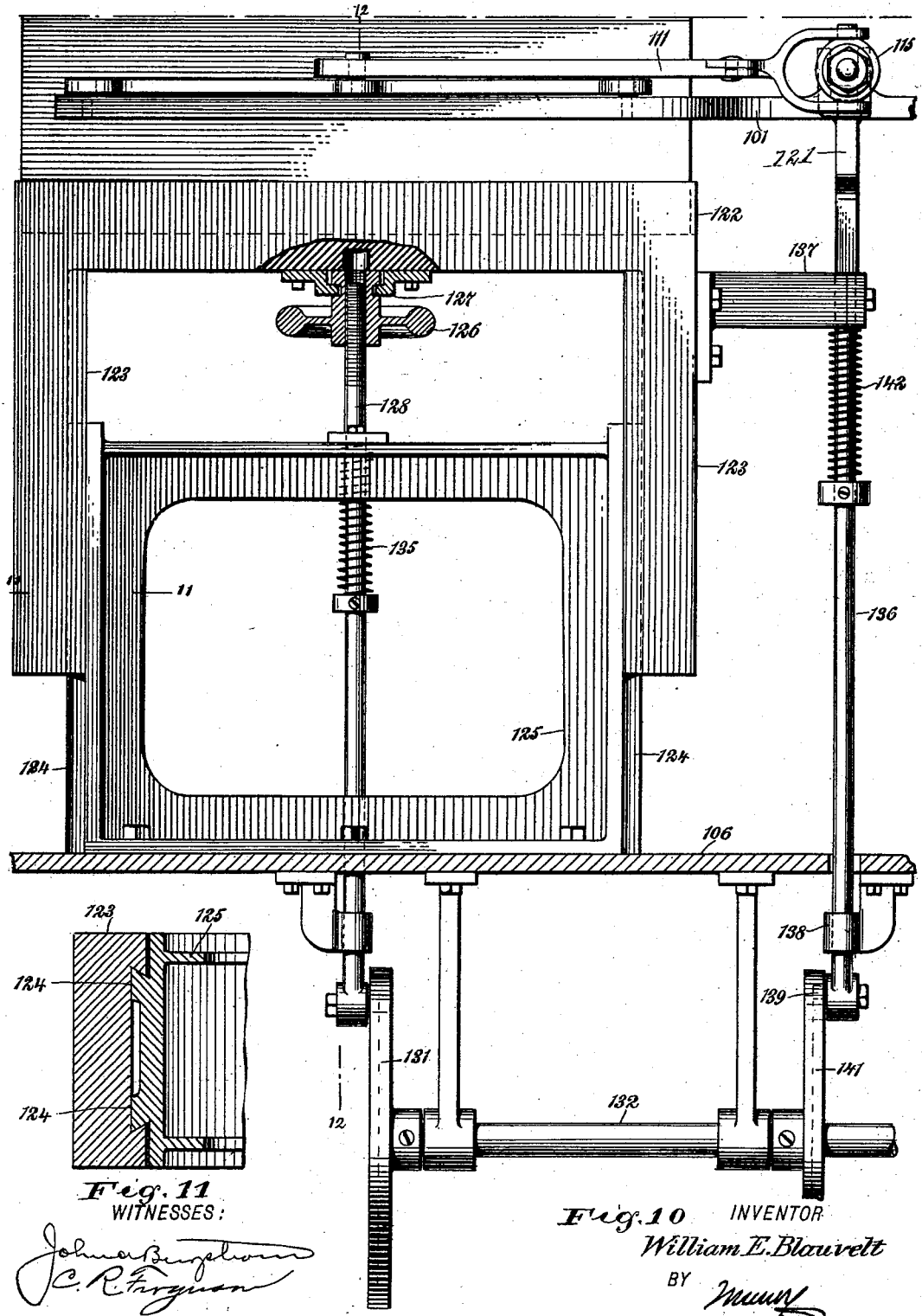

No. 715,540. Patented Dec. 9, 1902.
W. E. BLAUVELT.
BOOKBINDING MACHINE.
(Application filed Nov. 27, 1901.)
(No Model.) 30 Sheets—Sheet 7.
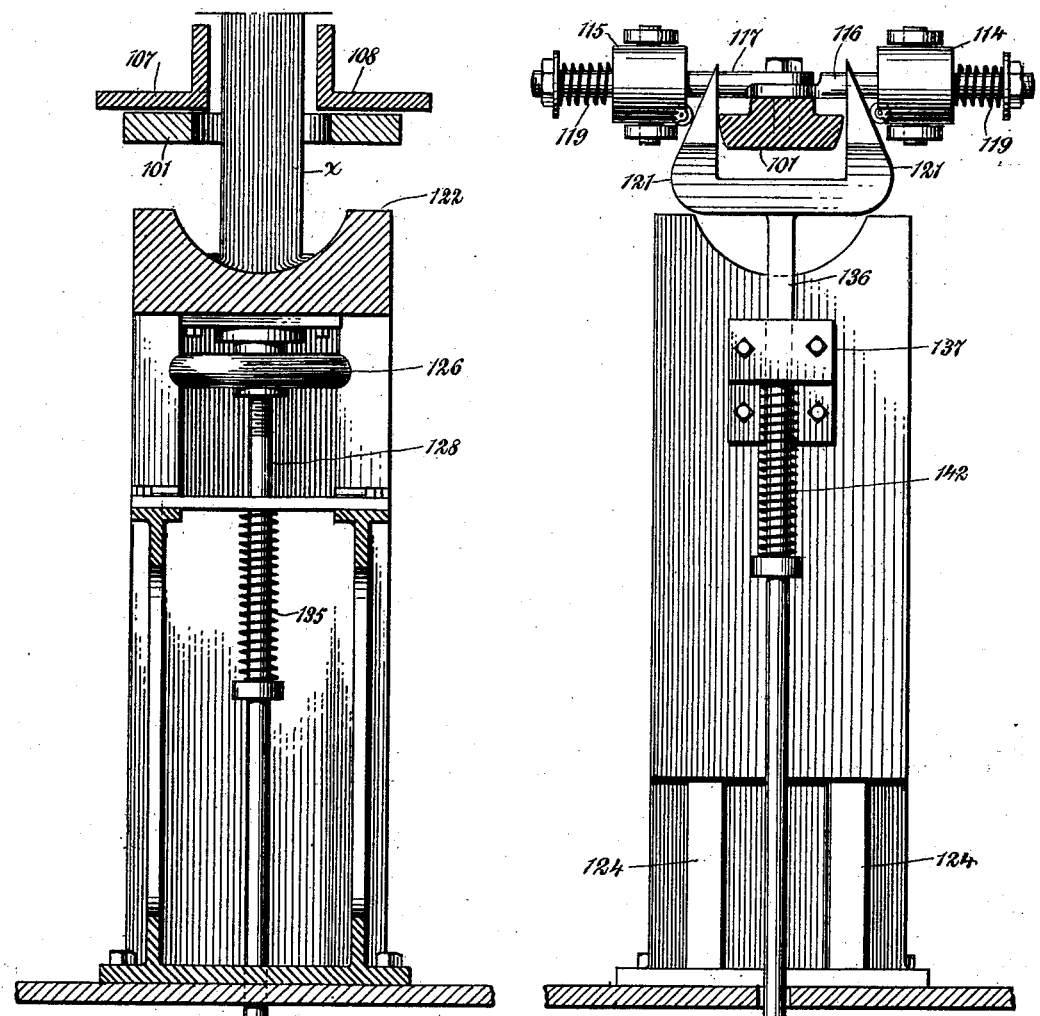
Fig. 12
Fig. 13
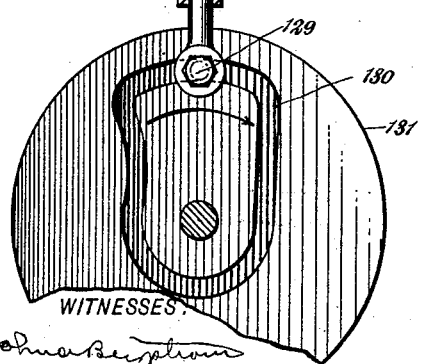
WITNESSES
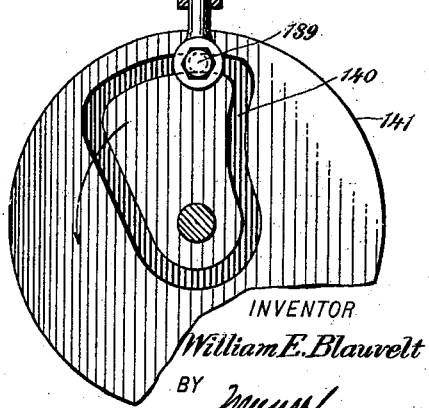
INVENTOR
William E. Blauvelt
BY
ATTORNEYS

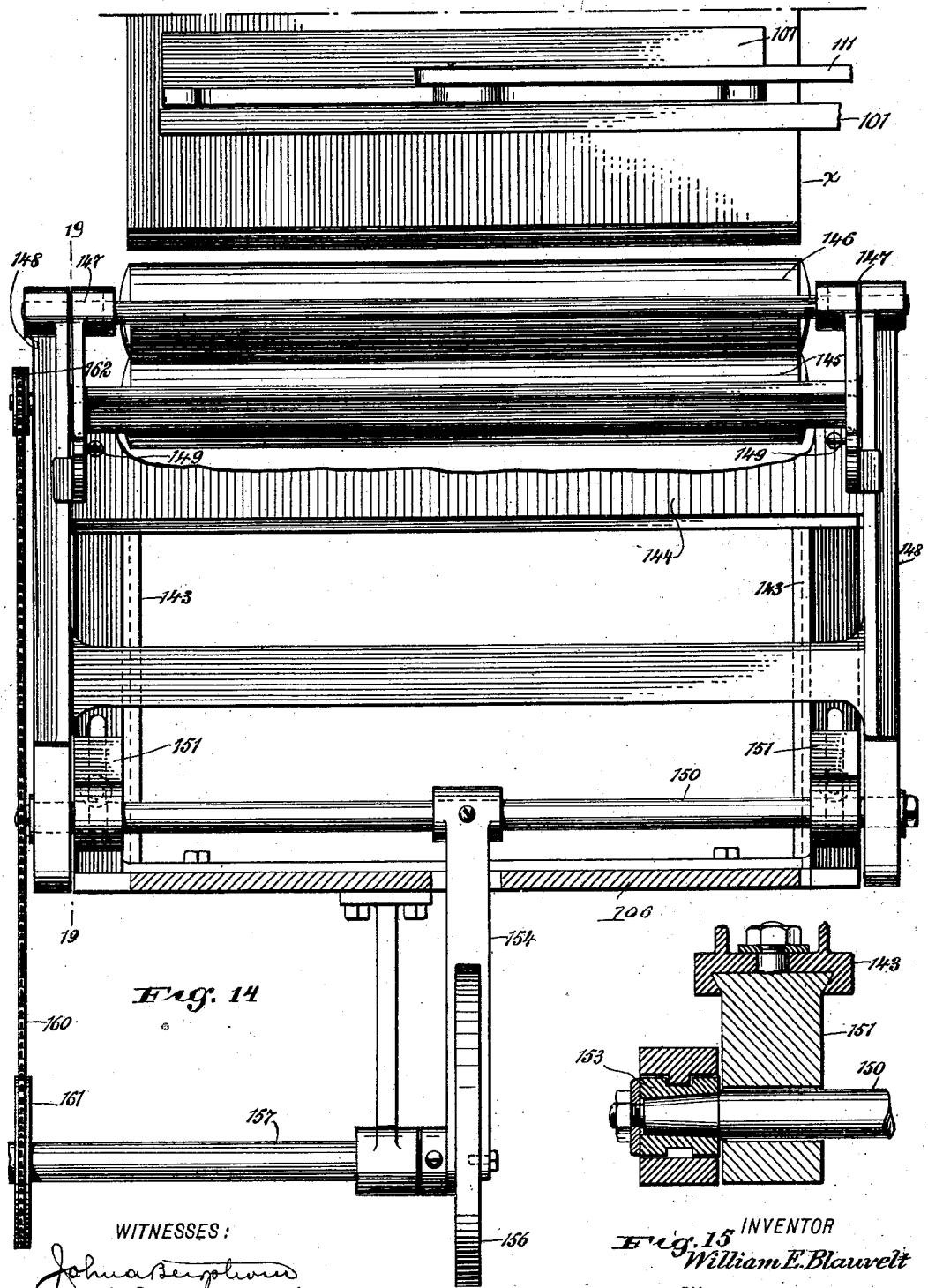

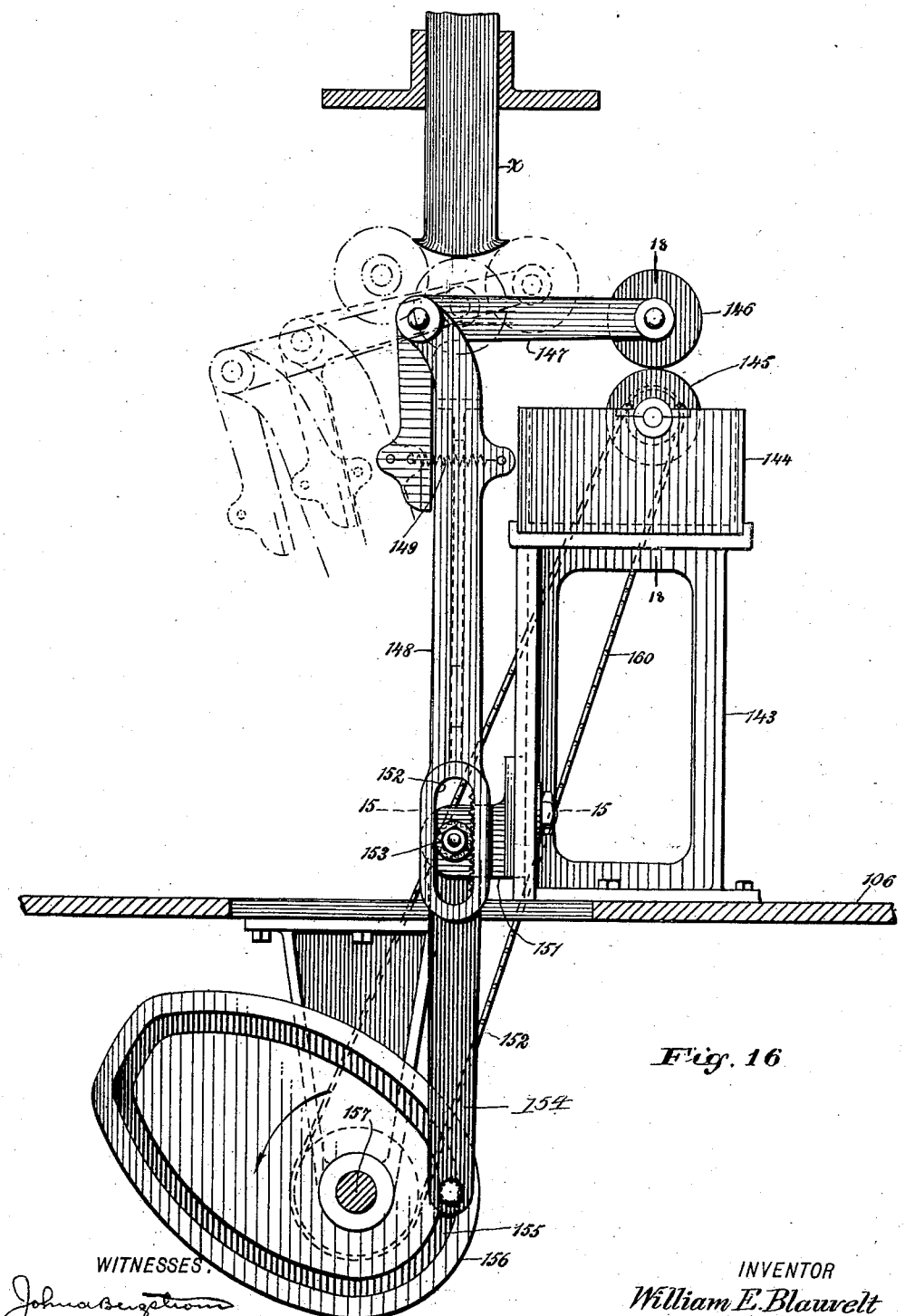

No. 715,540. Patented Dec. 9, 1902.
W. E. BLAUVELT.
BOOKBINDING MACHINE.
(Application filed Nov. 27, 1901.)
(No Model.) 30 Sheets—Sheet 10.
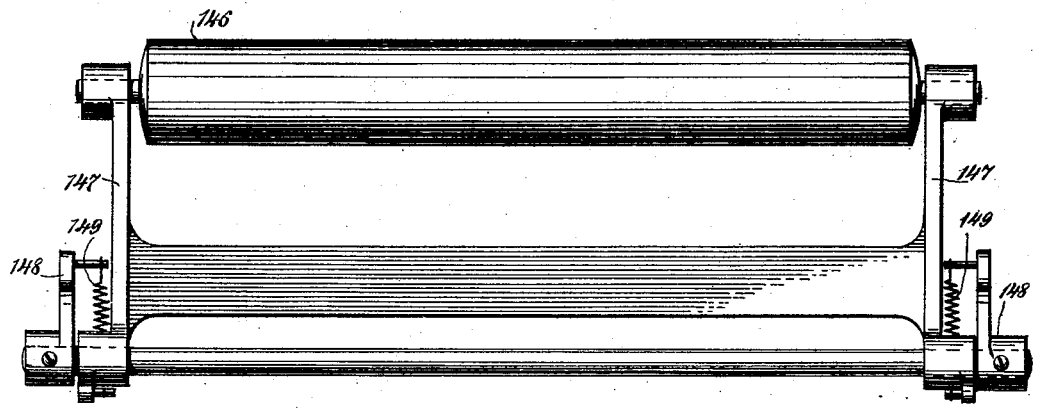
Fig. 17
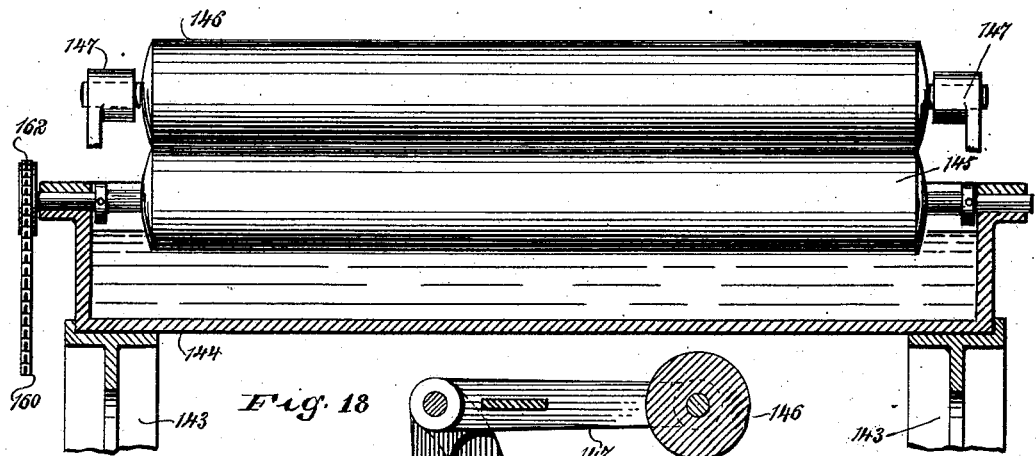
Fig. 18
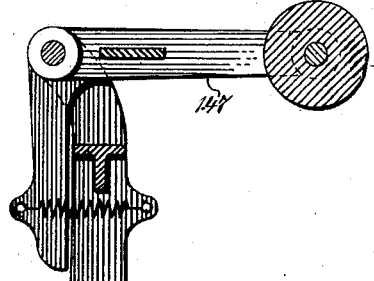
Fig. 19
WITNESSES: 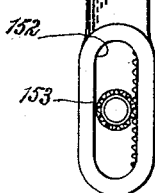
INVENTOR
William E. Blauvelt
BY
ATTORNEYS

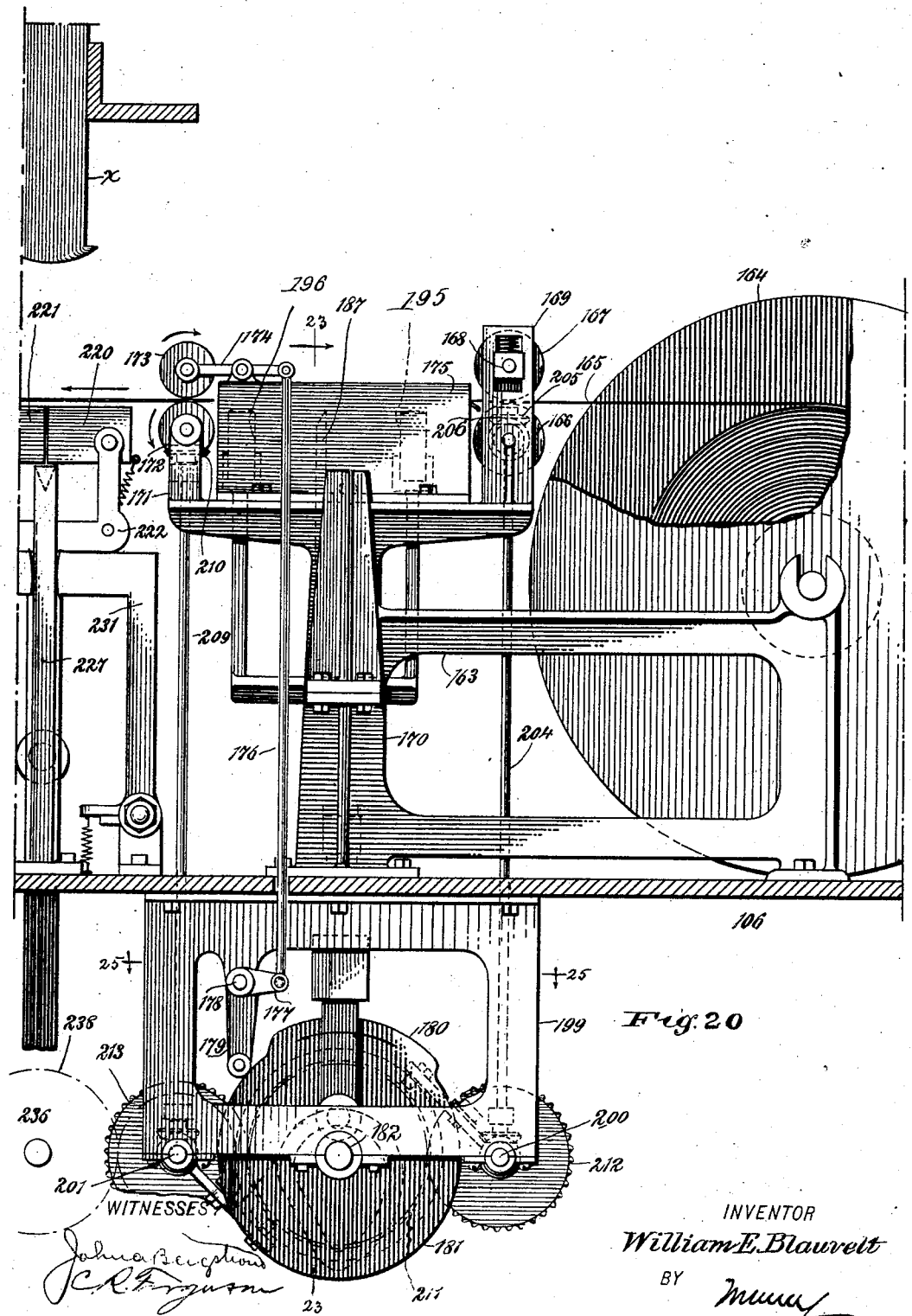

No. 715,540. Patented Dec. 9, 1902.
W. E. BLAUVELT.
BOOKBINDING MACHINE.
Application filed Nov. 27, 1901.
(No Model.) 30 Sheets—Sheet 12.
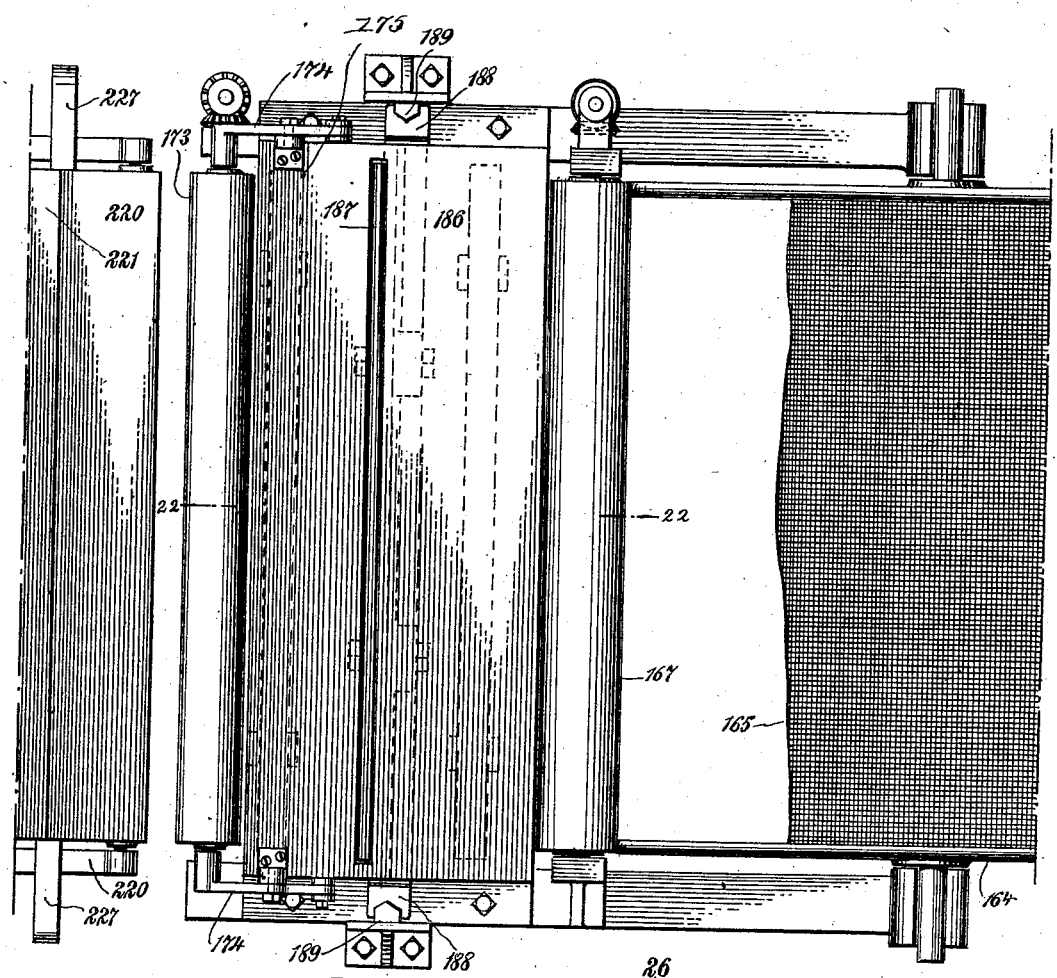
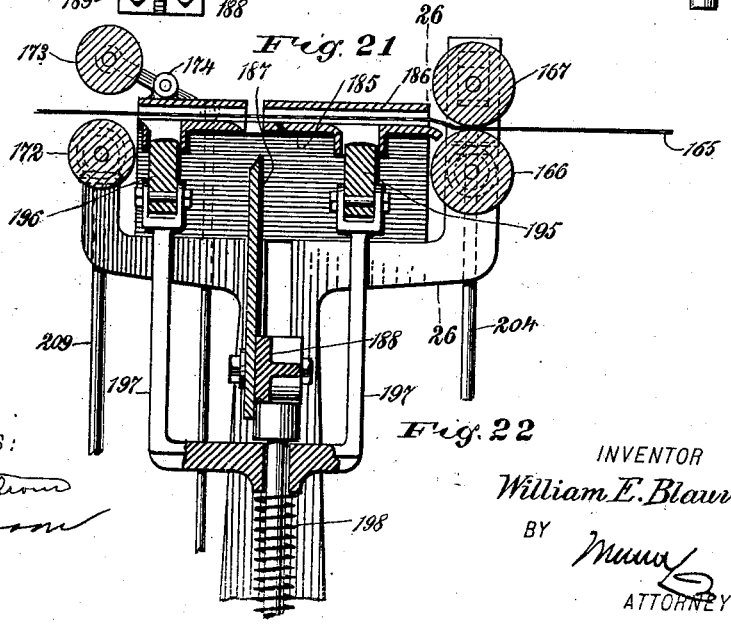
WITNESSES:
INVENTOR
William E. Blauvelt
BY
ATTORNEYS No. 715,540. Patented Dec. 9, 1902.
W. E. BLAUVELT.
BOOKBINDING MACHINE.
Application filed Nov. 27, 1901.

(No Model.) 30 Sheets—Sheet 13.

WITNESSES:

INVENTOR
William E. Blauvelt
BY
ATTORNEYS

No. 715,540. Patented Dec. 9, 1902.
W. E. BLAUVELT.
BOOKBINDING MACHINE.
(Application filed Nov. 27, 1901.)
(No Model.) 30 Sheets—Sheet 14.
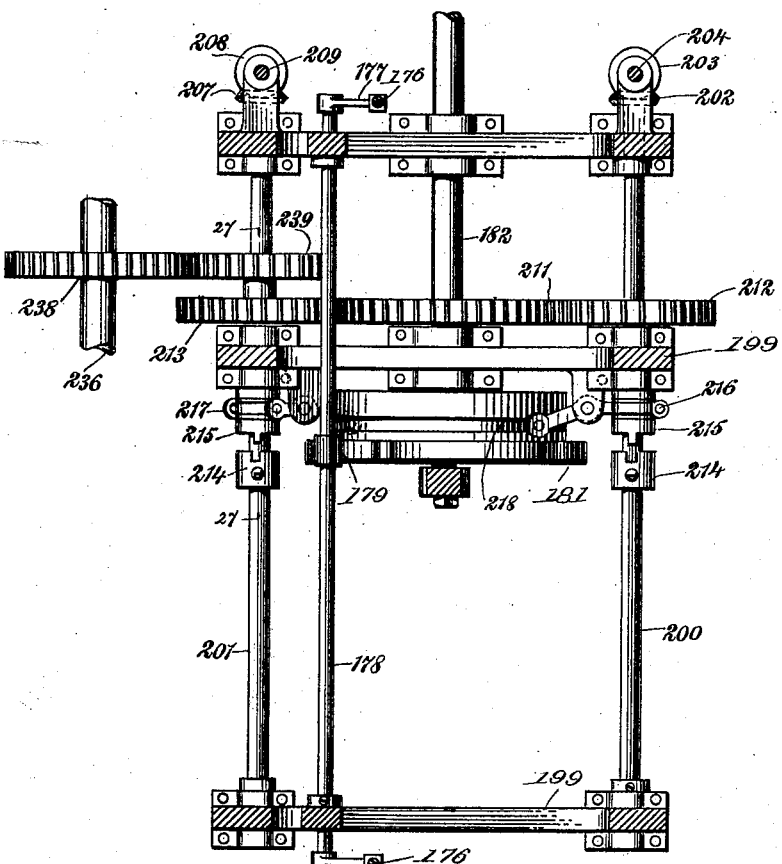
Fig. 25
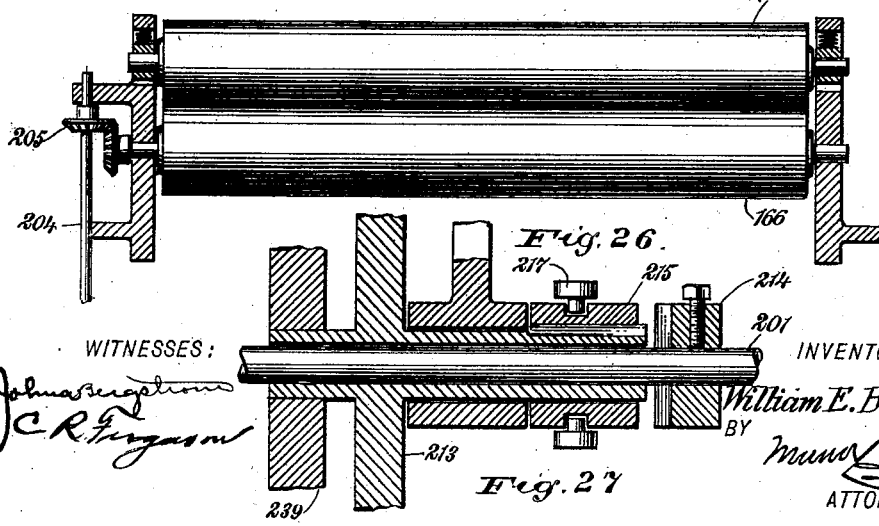
Fig. 26.
Fig. 27
WITNESSES:
INVENTOR
William E. Blauvelt
BY
ATTORNEYS No. 715,540. Patented Dec. 9, 1902.
W. E. BLAUVELT.
BOOKBINDING MACHINE.
(Application filed Nov. 27, 1901.)

(No Model.) 30 Sheets—Sheet 16.

WITNESSES:
INVENTOR
William E. Blauvelt
BY
ATTORNEYS

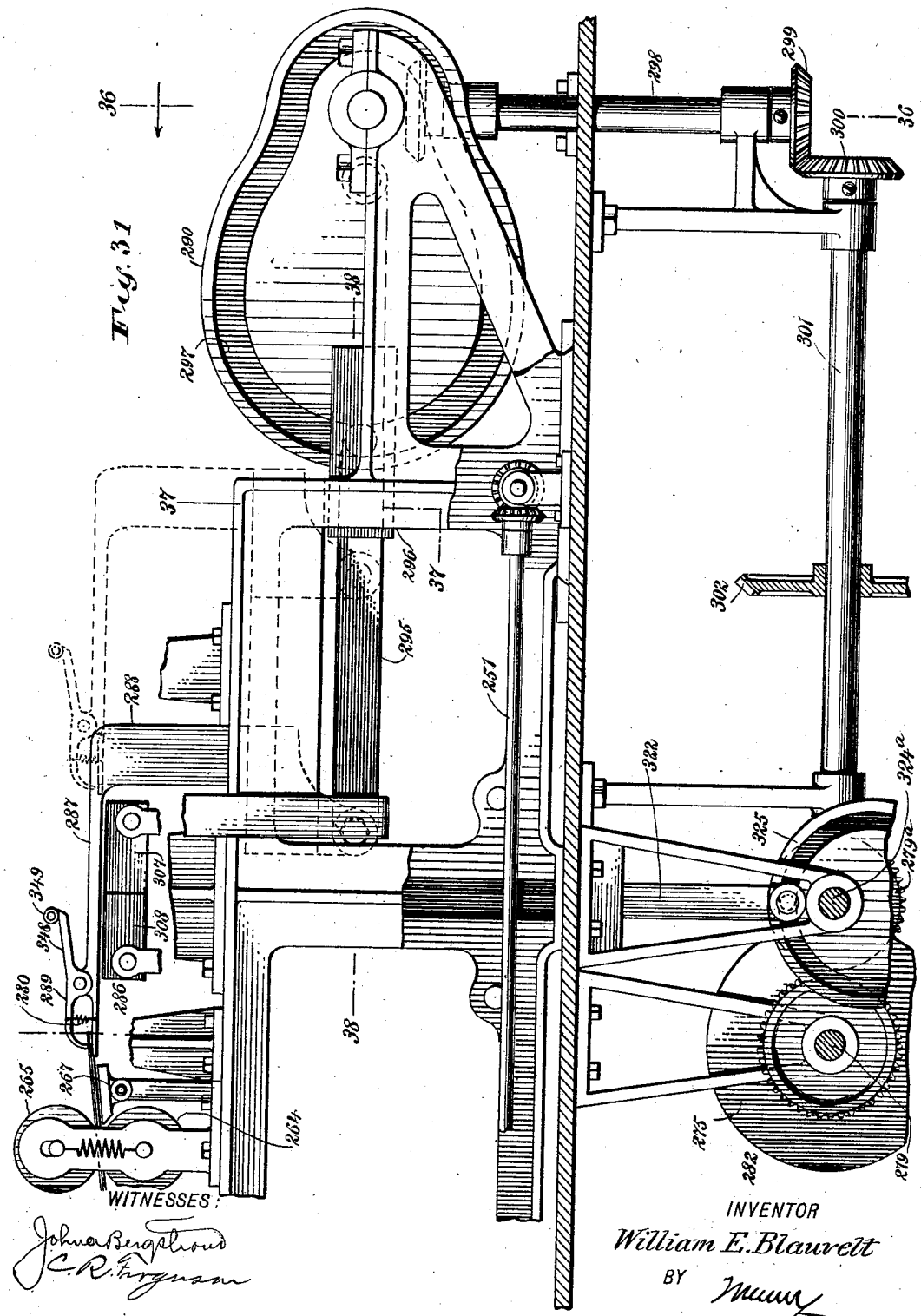

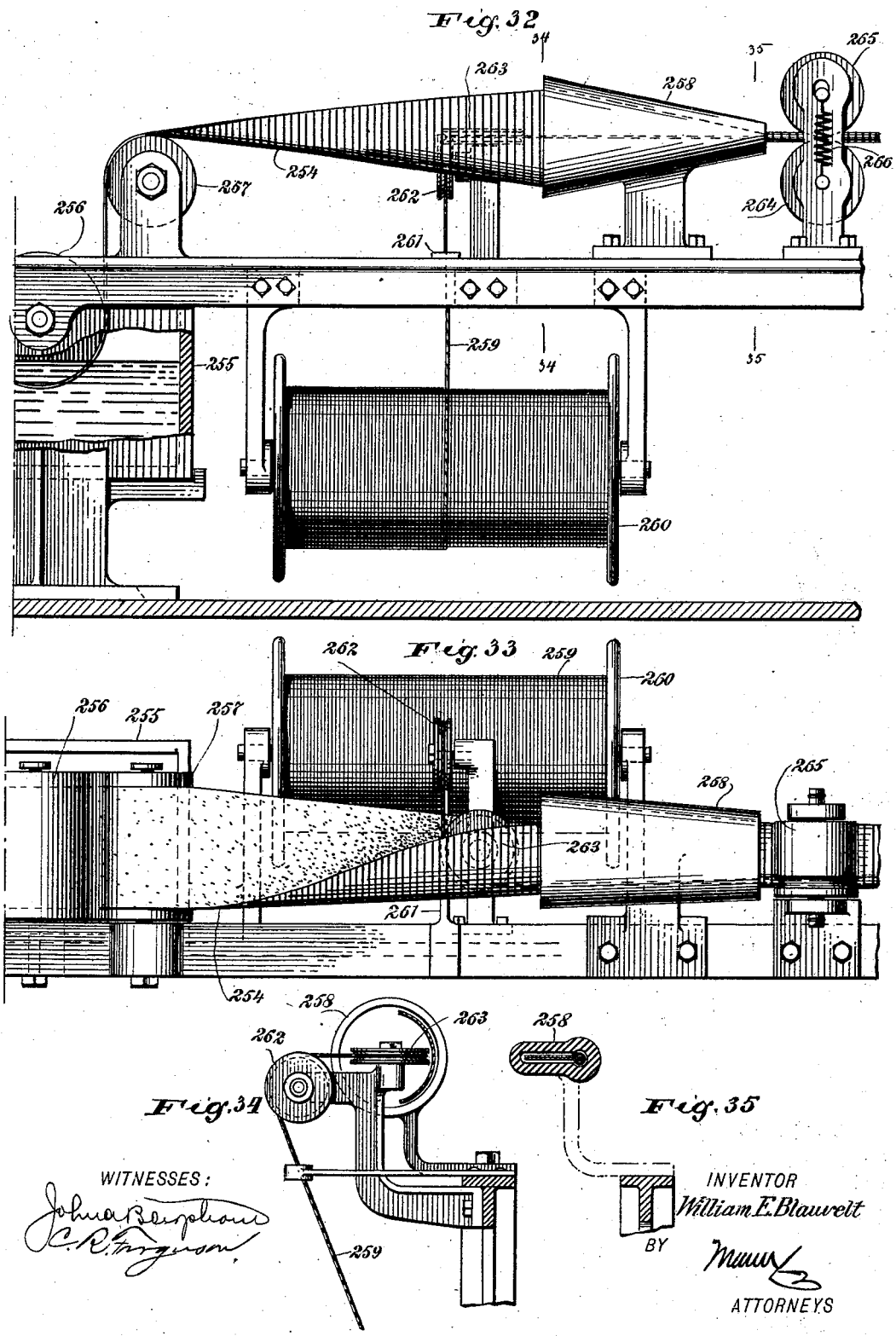

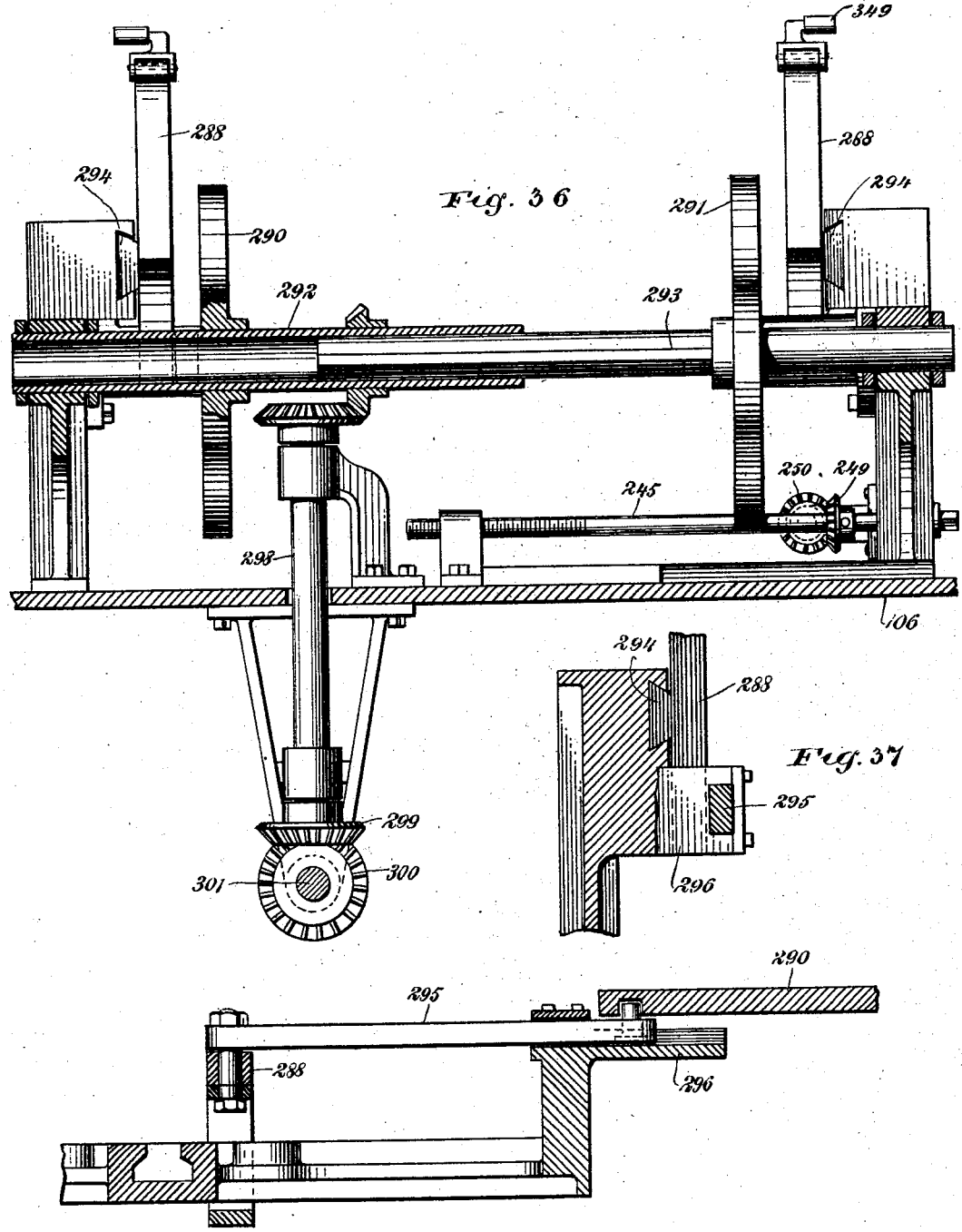

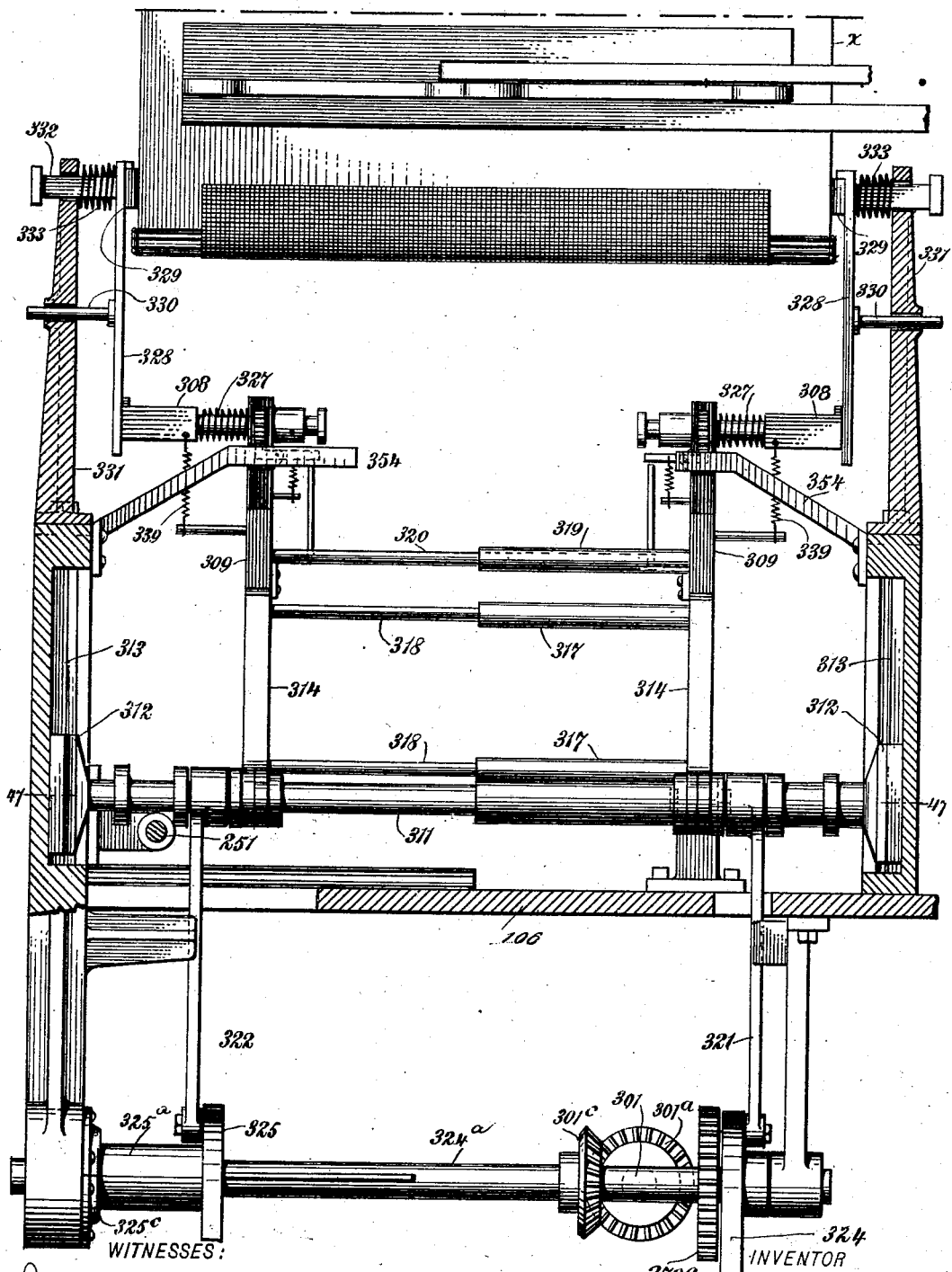

No. 715,540. Patented Dec. 9, 1902.
W. E. BLAUVELT.
BOOKBINDING MACHINE.
(Application filed Nov. 27, 1901.)
(No Model.) 30 Sheets—Sheet 21.
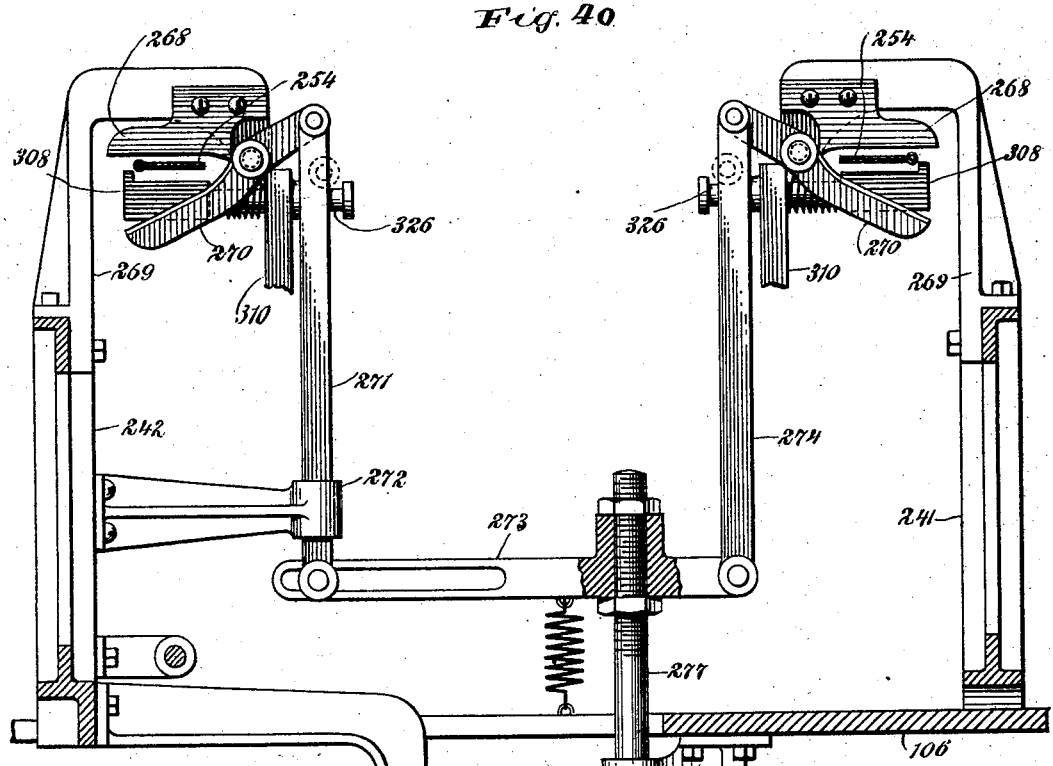
Fig. 40.
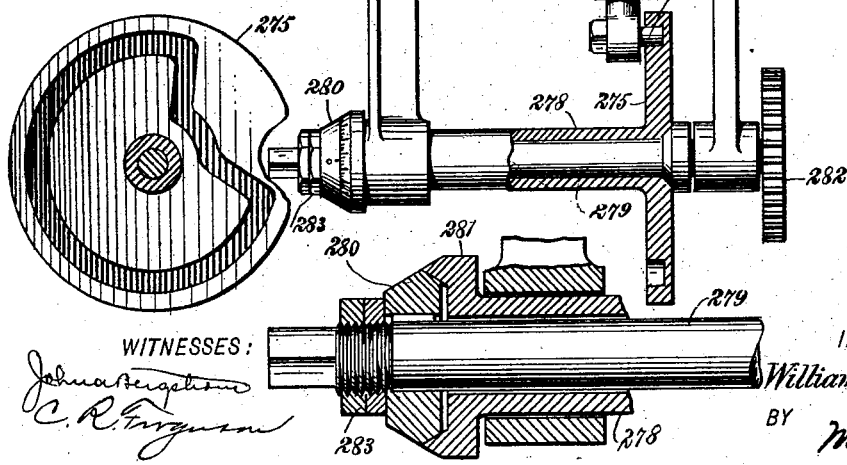
Fig. 41.
Fig. 42.
WITNESSES:
INVENTOR
William E. Blauvelt
BY
ATTORNEYS No. 715,540. Patented Dec. 9, 1902.
W. E. BLAUVELT.
BOOKBINDING MACHINE.
(Application filed Nov. 27, 1901.)
(No Model.) 30 Sheets—Sheet 22.
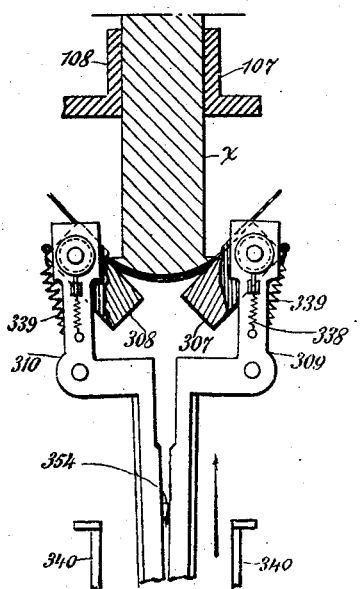
Fig. 44
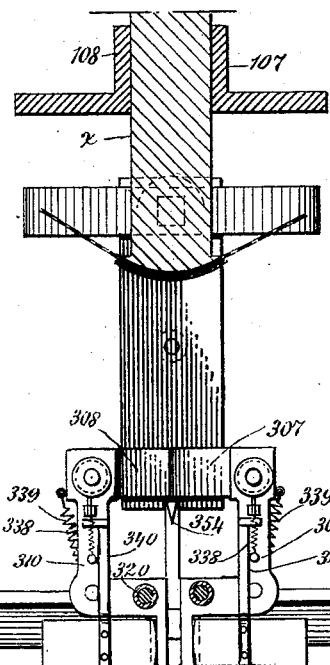
Fig. 43
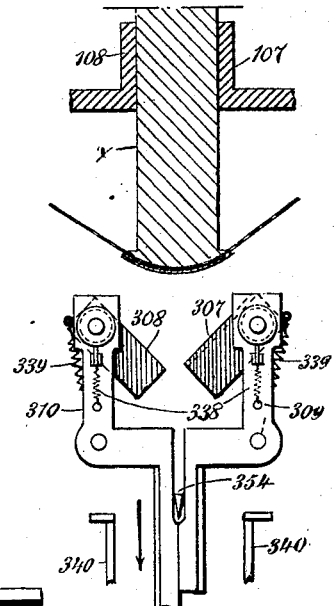
Fig. 45
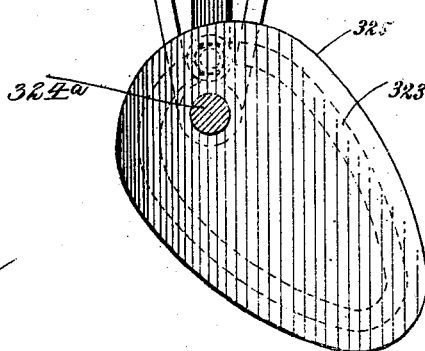
WITNESSES:
INVENTOR
William E. Blauvelt
BY
ATTORNEYS No. 715,540. Patented Dec. 9, 1902.
W. E. BLAUVELT.
BOOKBINDING MACHINE.
(Application filed Nov. 27, 1901.)
(No Model.) 30 Sheets—Sheet 23.

WITNESSES:

INVENTOR
William E. Blauvelt
BY
ATTORNEYS

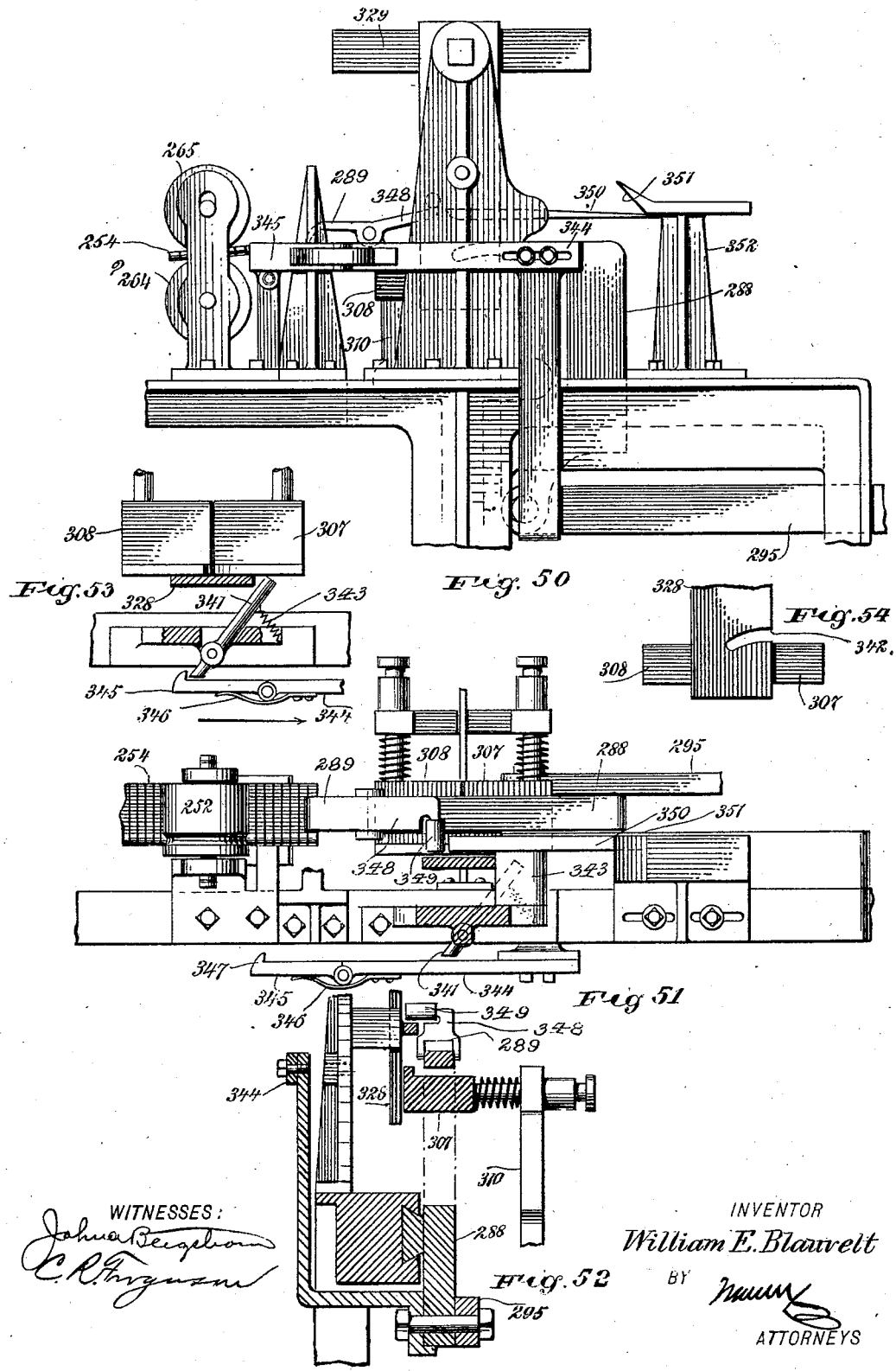

No. 715,540. Patented Dec. 9, 1902.
W. E. BLAUVELT.
BOOKBINDING MACHINE.
(Application filed Nov. 27, 1901.)

(No Model.) 30 Sheets—Sheet 25.

WITNESSES:
INVENTOR
William E. Blauvelt
BY
ATTORNEYS

THE NORRIS PETERS CO., PHOTO-LITHO., WASHINGTON, D. C.

No. 715,540. Patented Dec. 9, 1902.
W. E. BLAUVELT.
BOOKBINDING MACHINE.
Application filed Nov. 27, 1901.

(No Model.) 30 Sheets—Sheet 28.

WITNESSES:

INVENTOR
William E. Blauvelt
BY
ATTORNEYS

No. 715,540. Patented Dec. 9, 1902.
W. E. BLAUVELT.
BOOKBINDING MACHINE.
(Application filed Nov. 27, 1901.)
(No Model.) 30 Sheets—Sheet 29.

WITNESSES:

INVENTOR
William E. Blauvelt
BY
ATTORNEYS

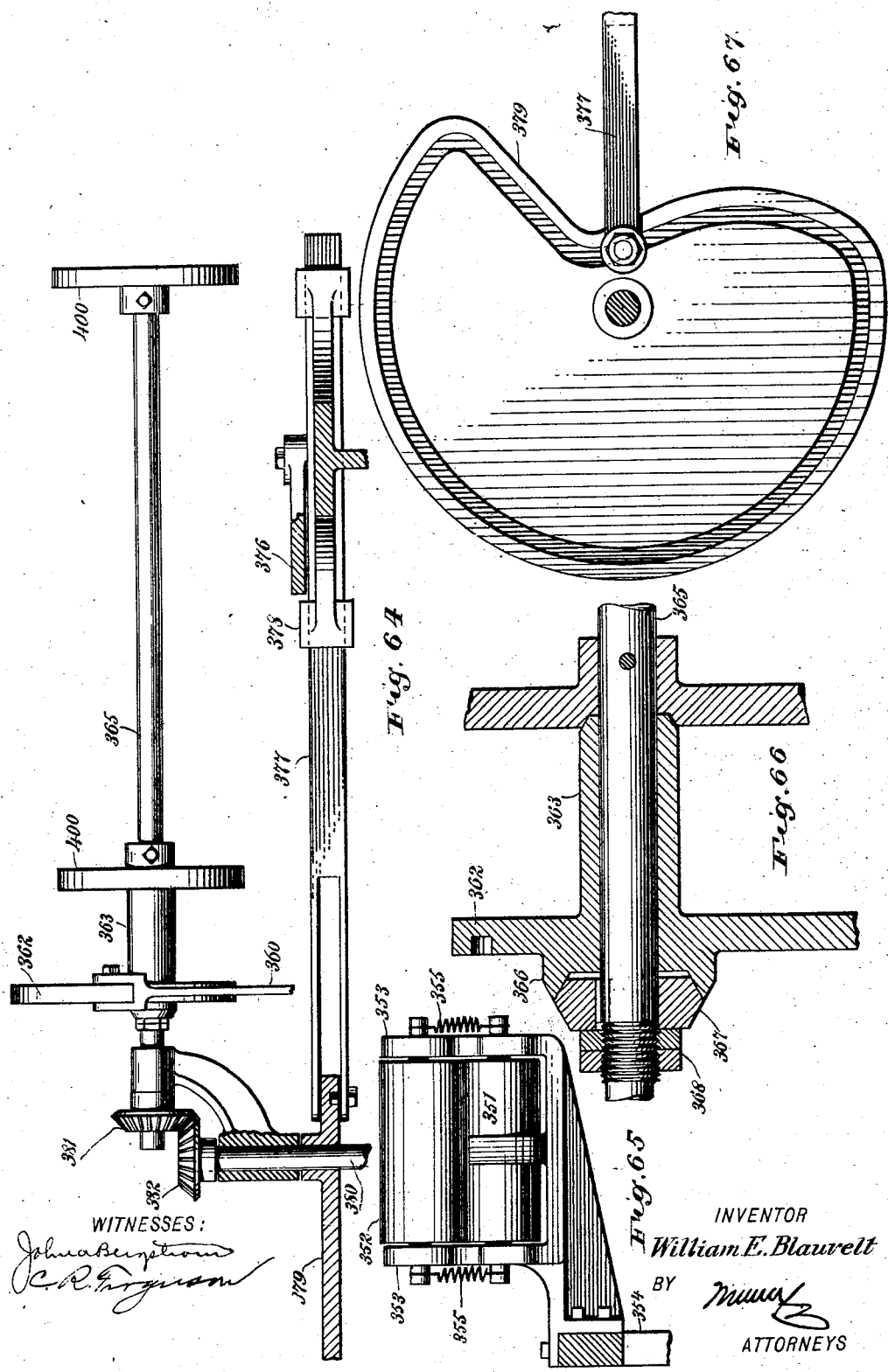

UNITED STATES PATENT OFFICE.

WILLIAM EDGAR BLAUVELT, OF BROOKLYN, NEW YORK, ASSIGNOR TO HIMSELF, AND EDWARD WEST, OF NEW YORK, N. Y.

BOOKBINDING-MACHINE.

SPECIFICATION forming part of Letters Patent No. 715,540, dated December 9, 1902.

Application filed November 27, 1901. Serial No. 83,895. (No model.)

*To all whom it may concern:*

Be it known that I, WILLIAM EDGAR BLAUVELT, a citizen of the United States, and a resident of the city of New York, borough of Brooklyn, in the county of Kings and State of New York, have invented a new and Improved Bookbinding-Machine, of which the following is a full, clear, and exact description.

This invention relates particularly to machines for affixing the crash, the head-bandings, and the paper lining to books preparatory to the final binding; and the object is to provide a machine by means of which the several steps may be carried out consecutively and rapidly, the devices for performing the different operations being actuated from a single driving or main shaft, the said shaft also operating the carrier for moving the books to the series of devices. The machine also comprises means for applying adhesive, forming the head-bandings, and cutting the material in the proper lengths.

I will describe a bookbinding-machine embodying my invention, and then point out the novel features in the appended claims.

Reference is to be had to the accompanying drawings, forming a part of this specification, in which similar characters of reference indicate corresponding parts in all the figures.

Figures 23, 24:
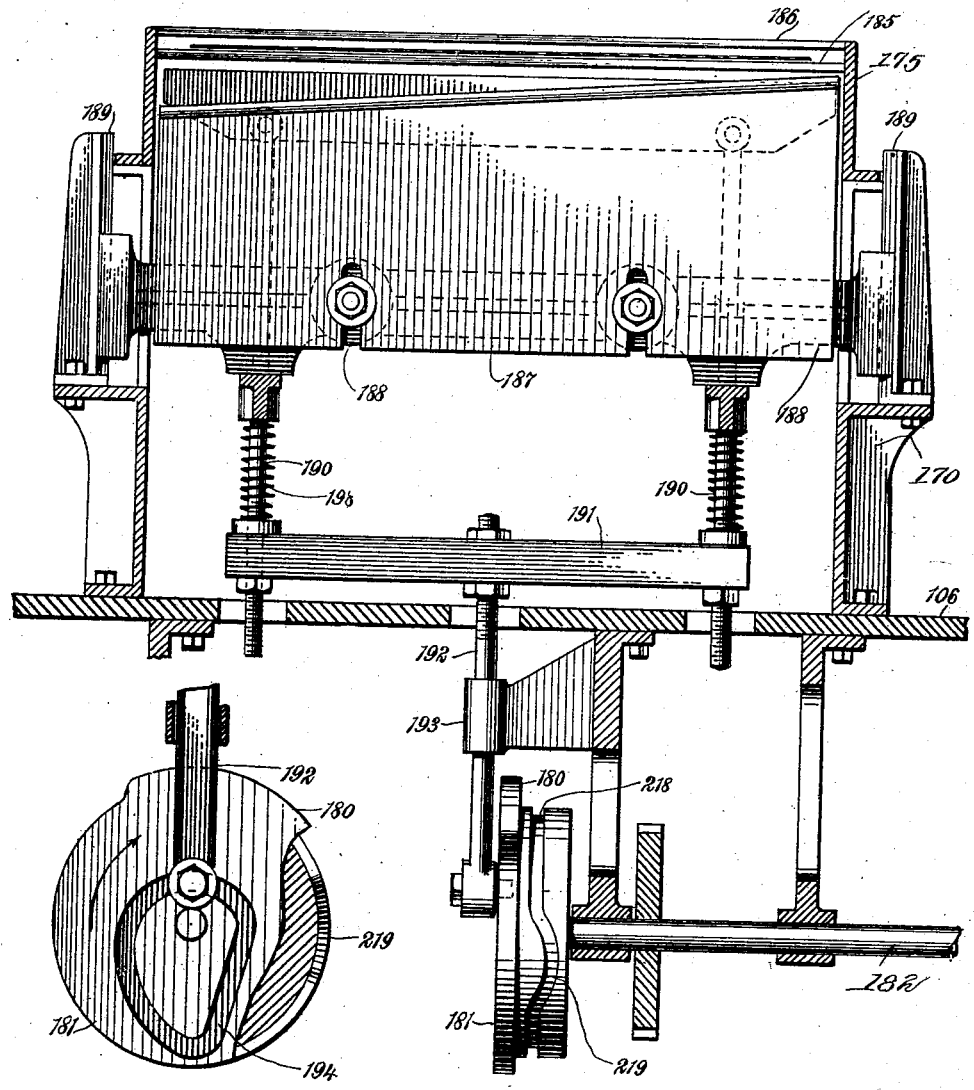
Figure 28:
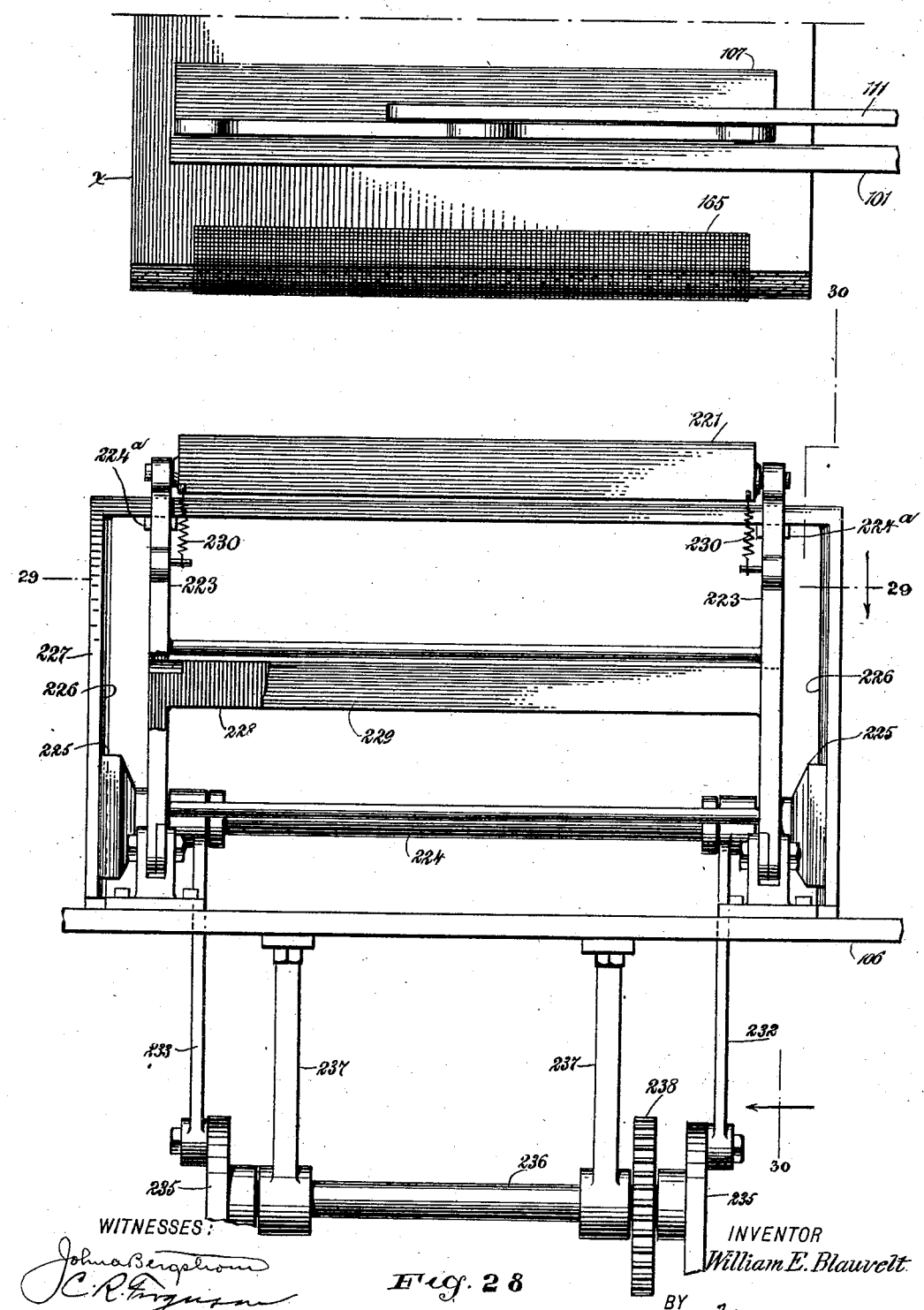
Figure 29:
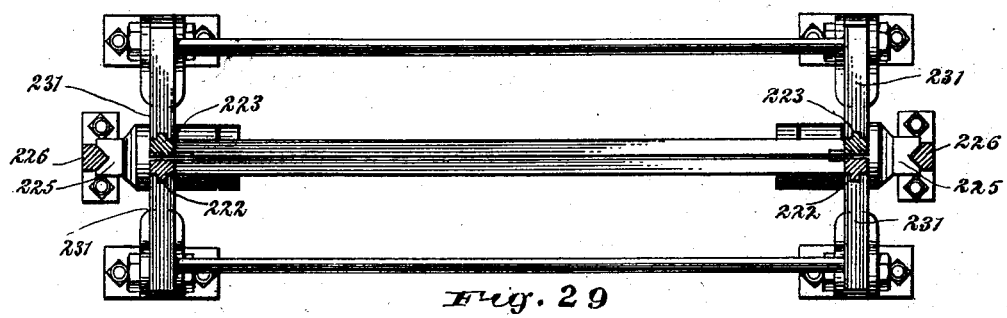
Figure 30:
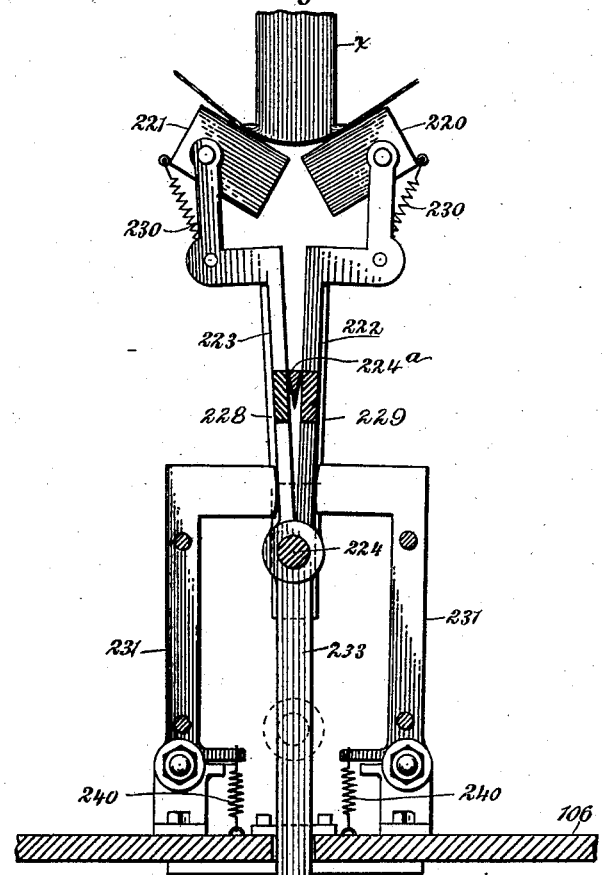
Figure 46:
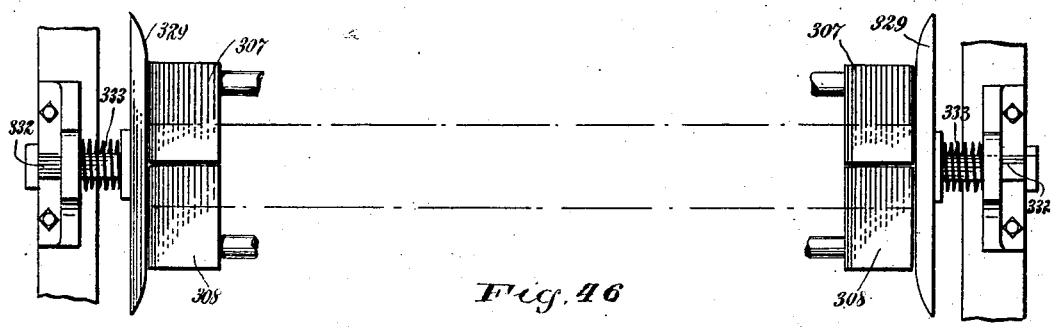
Figure 47:
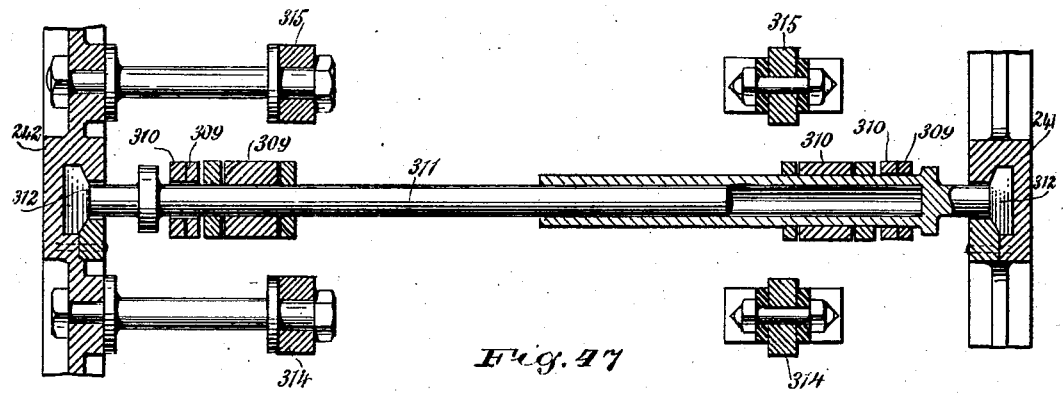
Figures 48, 49:
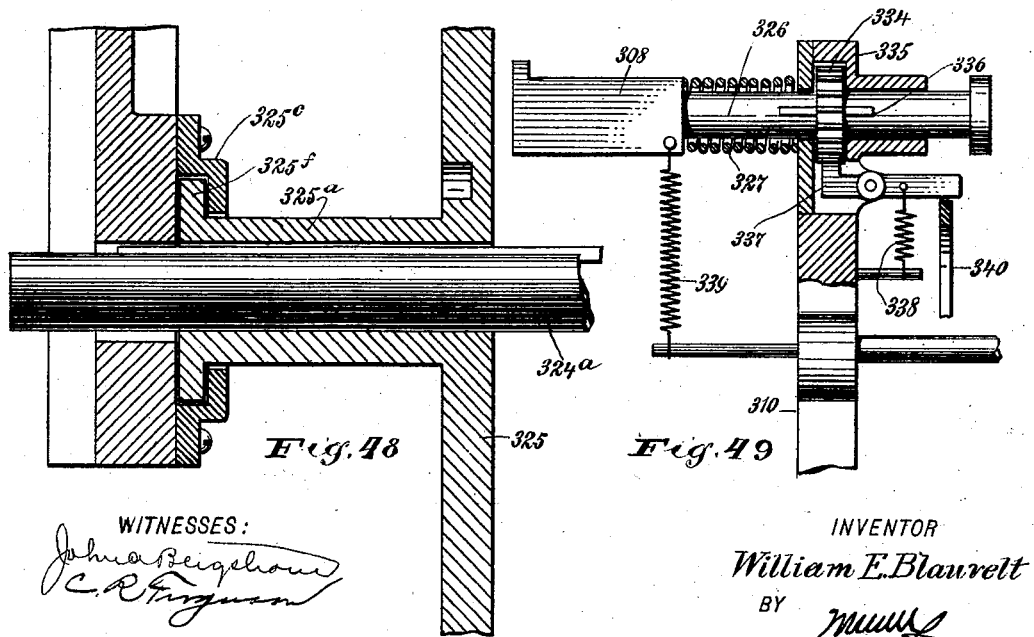
Figure 55:
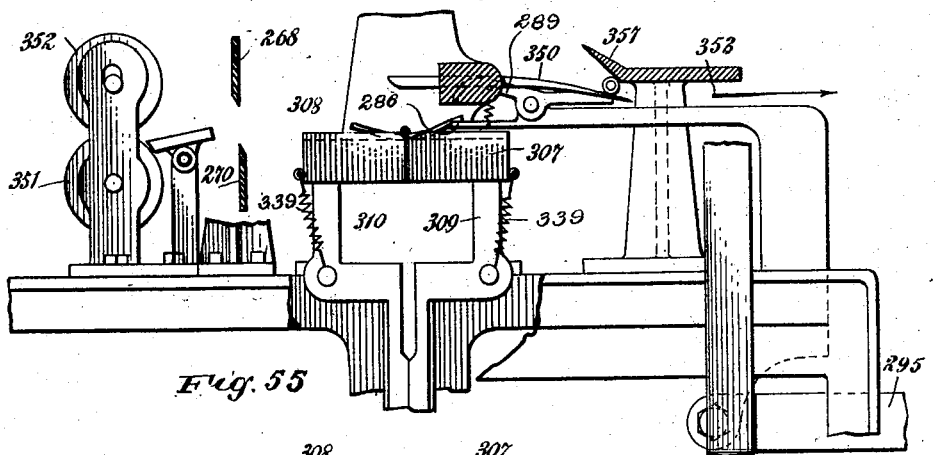
Figure 56:
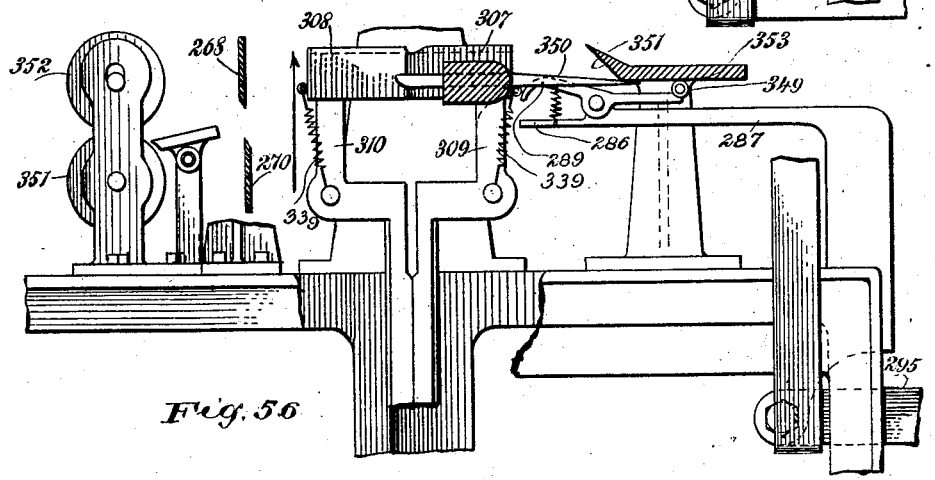
Figure 57:
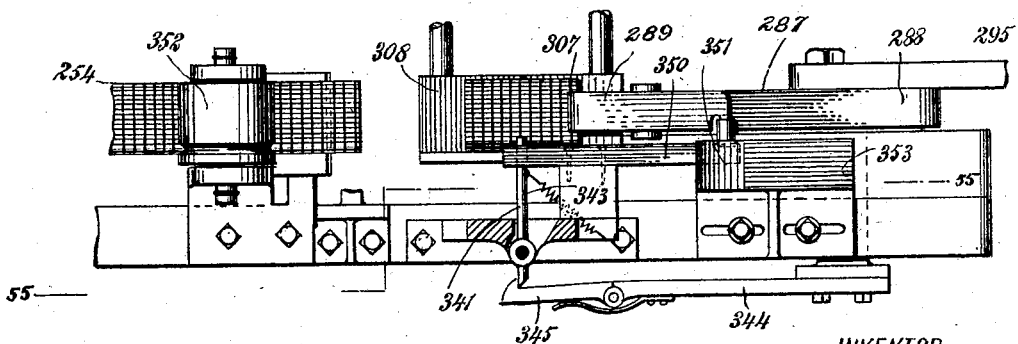

Figures 1$^a$ and 1$^b$ show in general plan a bookbinding-machine embodying my invention. Fig. 2 is a section on the line 2 2 of Figs. 1$^a$ and 1$^b$. Fig. 3 is a detail showing a means for operating the book-carrier. Fig. 4 is a section on the line 4 4 of Fig. 3. Fig. 5 is a plan view of one of the book holding and carrying devices employed. Fig. 6 is a side view thereof. Fig. 7 is a section on the line 7 7 of Fig. 5. Fig. 8 is a section on the line 8 8 of Fig. 5. Fig. 9 is a section on the line 9 9 of Fig. 5. Fig. 10 is a side elevation of the book-feeding table. Fig. 11 is a section on the line 11 11 of Fig. 10. Fig. 12 is a section on the line 12 12 of Fig. 10. Fig. 13 is an elevation showing a means for spreading the members of the book-holder. Fig. 14 is an elevation of an adhesive-applying device employed. Fig. 15 is a section on the line 15 15 of Fig. 16. Fig. 16 is a side view of Fig. 14. Fig. 17 is a plan view of the adhesive-applying device. Fig. 18 is an elevation thereof. Fig. 19 is a section on the line 19 19 of Fig. 14. Fig. 20 is a side elevation of the crash-applying mechanism. Fig. 21 is a plan view thereof. Fig. 22 is a section on the line 22 22 of Fig. 21. Fig. 23 is a section on the line 23 23 of Fig. 20. Fig. 24 is a face view of an actuating-cam employed. Fig. 25 is a section on the line 25 25 of Fig. 20. Fig. 26 is a section on the line 26 26 of Fig. 21. Fig. 27 is a section on the line 27 27 of Fig. 25. Fig. 28 is an elevation showing the platens for pressing the crash. Fig. 29 is a section on the line 29 29 of Fig. 28. Fig. 30 is a section on the line 30 30 of Fig. 28. Fig. 31 is a side elevation of the head-band-applying device. Fig. 32 is a side elevation showing the mechanism for forming the head-bandings. Fig. 33 is a plan view thereof. Fig. 34 is a section on the line 34 34 of Fig. 32. Fig. 35 is a section on the line 35 35 of Fig. 32. Fig. 36 is a section on the line 36 36 of Fig. 31. Fig. 37 is a section on the line 37 37 of Fig. 31. Fig. 38 is a section on the line 38 38 of Fig. 31. Fig. 39 is a sectional elevation of a portion of the head-banding mechanism. Fig. 40 is an elevation showing the cutting mechanism for the head-bandings. Fig. 41 shows an operating-cam therefor. Fig. 42 is a sectional detail showing a means for regulating the operation of the cutters. Fig. 43 is a detail elevation showing the platen mechanism for the head-bandings. Figs. 44 and 45 illustrate different positions of the platens. Fig. 46 is a plan view thereof. Fig. 47 is a section on the line 47 47 of Fig. 39. Fig. 48 is a sectional detail showing an operating-cam employed. Fig. 49 is a sectional detail showing a means for holding the platens in the position shown in Fig. 45 during downward movement. Fig. 50 is a side elevation showing a gripper-tripping mechanism employed. Fig. 51 is a plan view thereof, partly in section. Fig. 52 is a vertical section through Fig. 50. Fig. 53 is a detail showing a holding-finger employed. Fig. 54 is a detail illustrating a means for depressing the finger. Fig. 55 is a side elevation similar to Fig. 50, but showing the gripper released and partly in section on the line 55 55 of Fig. 57. Fig. 56 is a similar section showing the gripper in its extreme rearward position. Fig. 57 is a plan view thereof.

Figure 58:
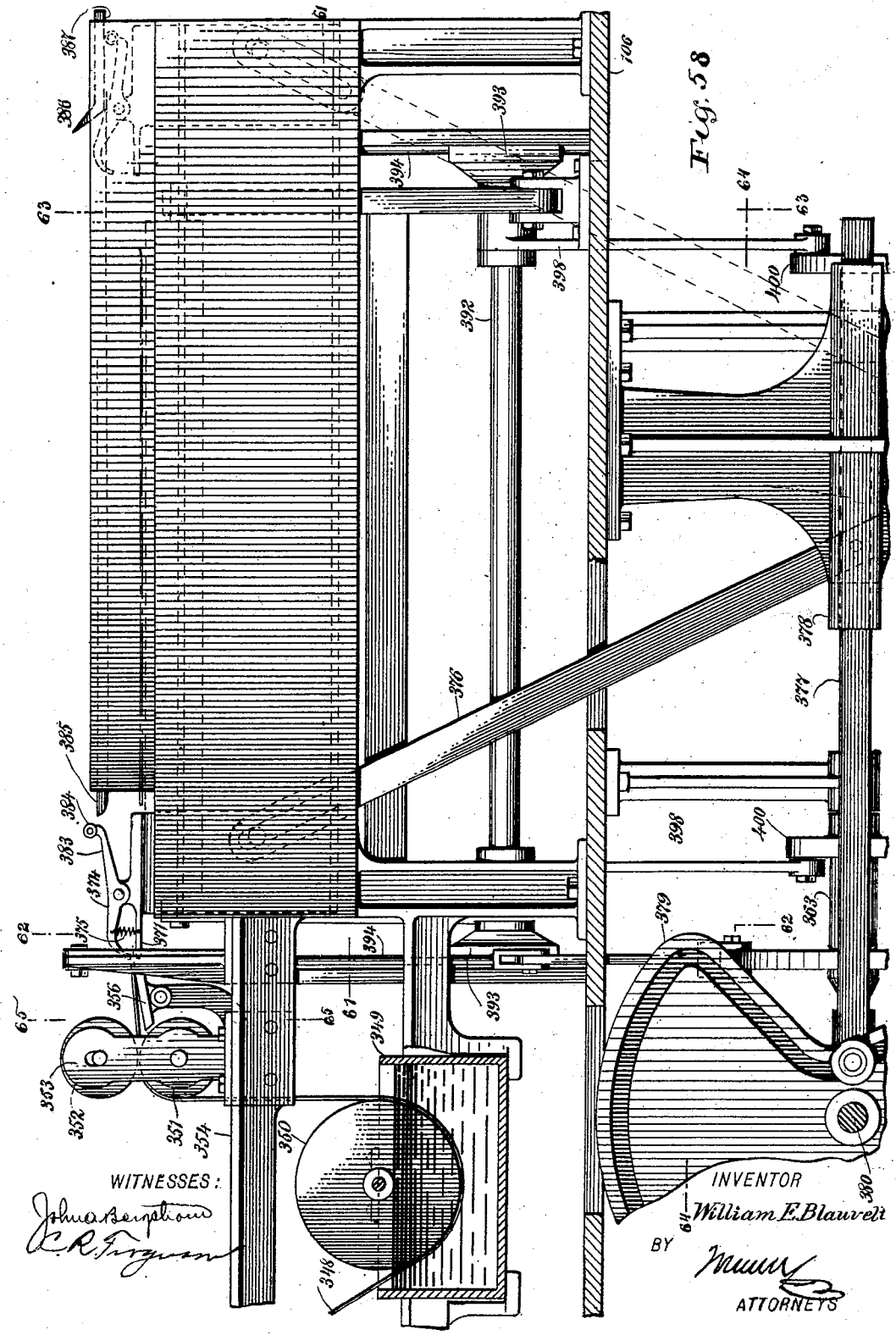
Figure 59:
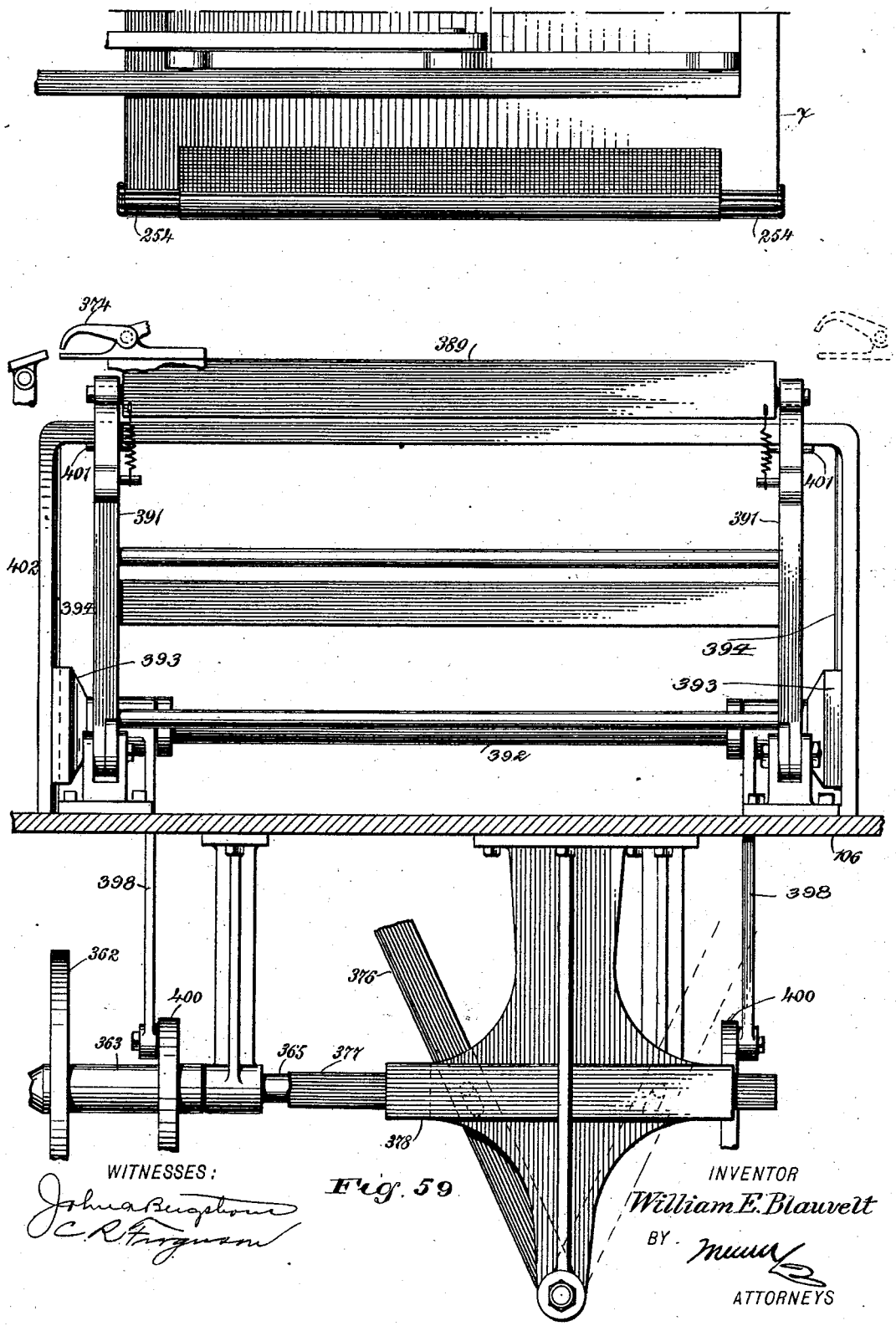
Figure 60:
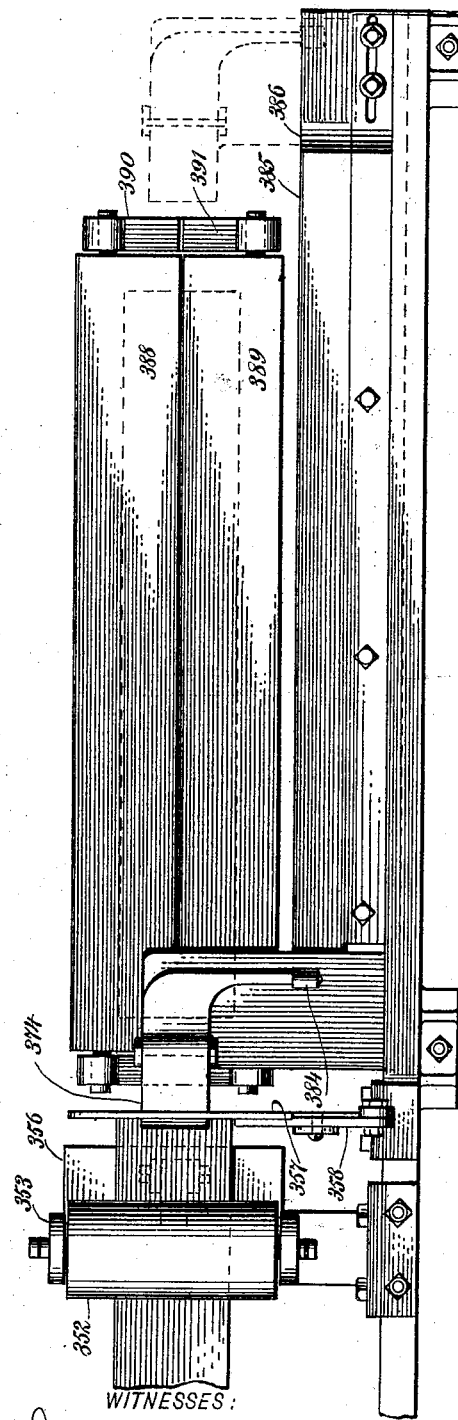
Figure 61:
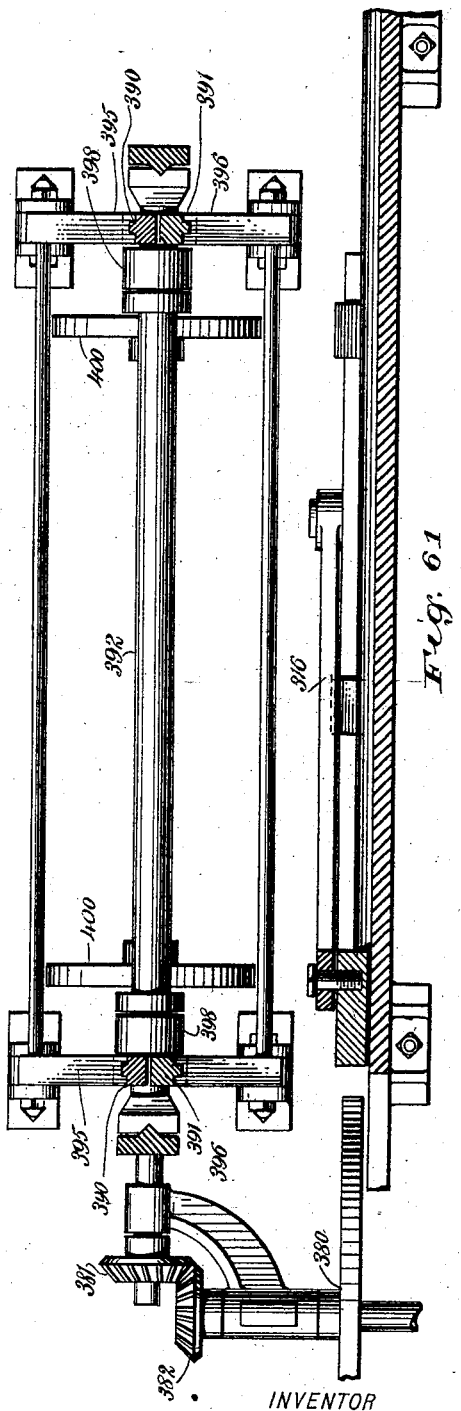
Figure 62:
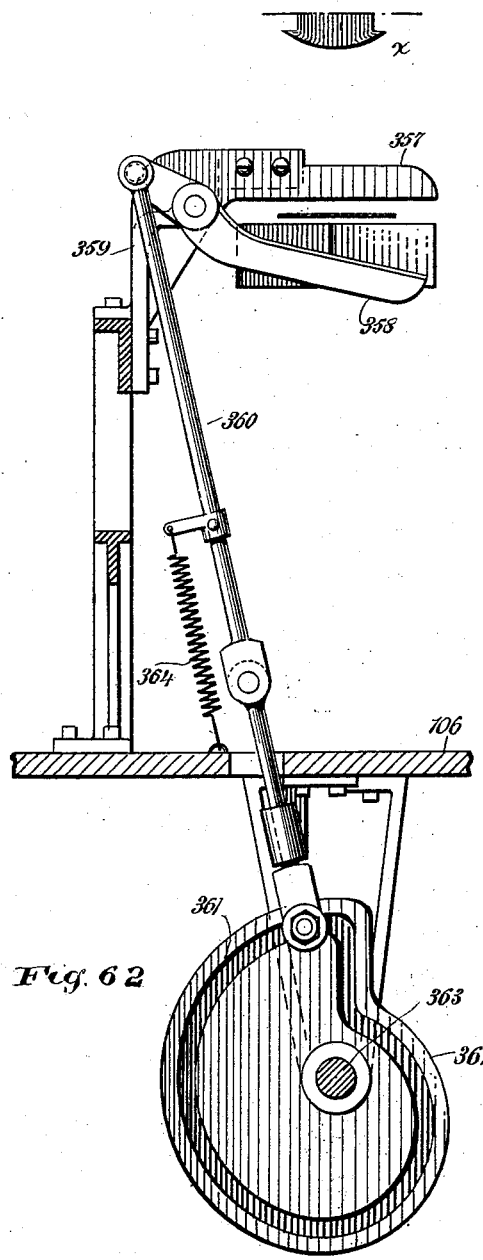
Figure 63:
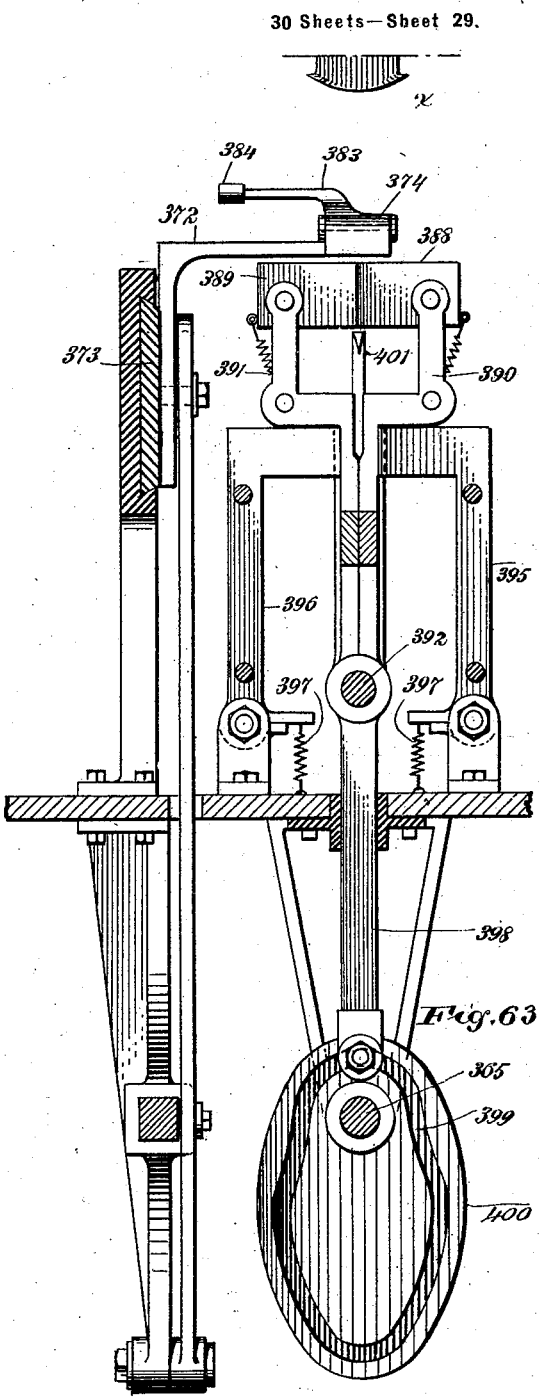

Fig. 58 is a side elevation of the lining-applying device. Fig. 59 is a front elevation thereof with the rear portion removed. Fig. 60 is a plan of Fig. 58. Fig. 61 is a section on the line 61 61 of Fig. 58. Fig. 62 is a section on the line 62 62 of Fig. 58. Fig. 63 is a section on the line 63 63 of Fig. 58. Fig. 64 is a section on the line 64 64 of Fig. 58. Fig. 65 is a section on the line 65 65 of Fig. 58. Fig. 66 is a detail showing an adjusting means for the cutter-operating cam, and Fig. 67 is a face view of a cam for moving the gripper-carrying carriage.

The machine comprises, arranged in regular order, as illustrated in plan in Figs. 1$^a$ and 1$^b$, a delivery-table A, the first gluing device B, the crash-applying device C, the second gluing or adhesive-applying device D, the head-band forming and applying device E, the paper-lining-applying device F, and the discharge-table G. The books are carried one after another over these several devices. As here shown, the carrier consists of a hub or disk 100, from which arms 101 radiate. This carrier is mounted on an upright shaft 102, on which is a worm-wheel 103, engaging with a worm 104 on the main driving-shaft 105, which is constantly and uniformly rotating. The shaft 102 extends through a table 106, and the main shaft 105, as here shown, is supported in hangers on said table, and one end of the driving-shaft is provided with a band pulley, as illustrated in the drawings. It will be noted that the cam 104 has a straight portion for considerable of its length and then a curved portion. The object of this long straight portion is to permit of a delay in the movement of the carrier at certain times—that is, from the adhesive-applying devices to the next device—thus permitting the adhesive to set. This feature, however, will be brought out more fully hereinafter. Mounted on the bifurcated end of each arm 101 are clamping-jaws 107 108. These jaws 107 108 are intended to maintain parallelism at all times to engage evenly upon opposite sides of the book $x$. Therefore they are provided at the ends with lugs 109, through which pins 110, extended upward from the fork members of the arm 101, extend. The jaws 107 108 are forced toward each other and apart by means of operating-jaws consisting of members 111 112, which are provided with slots at their ends, and through these slots pins 113 extend, these pins being connected to the clamping-jaw members. At their inner ends these parts 111 and 112 are crossed and pivotally connected together. The said inner ends are bifurcated or forked, and the end of the member 111 engages with pins on a collar 114, and the inner end of the member 112 engages with pins on a collar 115. These collars 114 and 115 are mounted to slide toward and from each other on rods 116 and 117, which are mounted to swing on a lug 118, extended upward from the arm 101. The collars are normally pressed toward each other by means of springs 119, the said springs engaging at their inner ends against the outer ends of the collars and at their outer ends against nuts adjustable on the said rods 116 and 117, and therefore the tension of the springs may be regulated.

Supported at the lower side and inner end of each collar is a roller 120, designed to be engaged by a spreading device consisting of fingers 121, which are inclined downward and outward at their outer edges, thus forming cam-surfaces, and the said fingers are spaced apart, so as to pass upward at the opposite sides of the arm 101. Before describing the means for operating the said spreader I will describe the receiving-table, or the table upon which the books are to be placed while engaged or placed in the holding devices. This receiving-table is indicated at 122. It is concaved at its top to receive the rounded binding edge of the book, and it may be here stated that when a book is placed in position between the jaws the inner end of the book must be placed closely up against the rear wall of the fork members of the arm 101. This is to insure the operation upon the book by the several devices notwithstanding the length of the book. This table 122 has side members 123, provided on the inner sides with channels to receive the guide-rails 124 on a frame 125, attached to the table 106. An interiorly-threaded hand-wheel 126 has rotary connection with the lower side of the table 122. As here shown, the hub of this wheel is provided with an exterior channel, in which holding devices 127 are engaged, these holding devices being bolted to the table. An operating-rod 128 has its screw-threaded portion engaged with the thread of the hand-wheel, and this rod is extended down through the frame 125 and through the table-top 106 and has at its lower end a lug 129, engaging in the cam-channel 130 of a cam-wheel 131, mounted on a shaft 132, driven from the main shaft by means of a bevel-gear 133 on said main shaft and a bevel-gear 134 on the shaft 132. The object in providing the screw-threaded connection of the rod with the table is to provide for the different lengths of throw of said table. The table is assisted in its downward movement by means of a spring 135, surrounding the rod 128 and engaging at its upper end with the frame 125 and at its lower end with a collar on said rod. The cam-channel 130 is so shaped as during the rotation of the wheel 131 to move the table upward to the proper position underneath the holding device, so that the book may be slid thereon between the jaws, and it is also designed after the jaws shall have gripped the book that the table shall have a quick downward movement to remove it, so that the book, with the carrier, may pass. At one side the channel is curved inward and then outward to cause an upward movement. Then the portion of the channel farthest from the center of the wheel is slightly curved, so as to hold the book in position until the grippers shall have operated, and then the opposite side is practically straight, whereby the table will move quickly downward partly under the influence of the spring 135. It will also be noted that the channel has a portion concentric with the shaft 132. Therefore while the lug 129 is passing through this portion there will be no motion of the table while the table is in its lowermost position. It may be here stated that the main driving-shaft and the several counter-shafts for operating the series of devices are in constant rotation.

The separating members 121 are mounted on an operating-rod 136, which is movable through a bearing 137, mounted on the end of the table 122, and this rod extends down through the opening in the table 106, through a hanger 138 on the table, and at its lower end it has a lug 139 engaging in the cam-channel 140 of a cam-wheel 141, mounted on the shaft 132. It will be noted by the arrows in Figs. 12 and 13 that the cam-wheels 131 and 141 face in opposite directions. The cam-channel 140 is shaped substantially like the cam-channel 130, but in opposite order and at a different angle therefrom, as clearly shown in said Figs. 12 and 13, and thus a quick upward movement of the spreader devices may be had and a quick downward movement, and when in the lowermost position the said devices will be held stationary. The rod 136 is assisted in its downward movement by means of a spring 142, engaging at its upper end with the bracket 137 and at its lower end with a collar on said rod 136. In the operation of this device as the arm 101, with its book-holder, reaches a point directly over the table 122 the rod 136 will be moved upward and the cam-surfaces of the parts 121 by engaging with the rollers 120 will cause a spreading of the jaws 107 and 108, and at this time the book is to be placed between the jaws, with its rounded back on the table-top. Then the cam 141 will cause a downward movement of the spreading device, permitting the springs 119 to force the jaws tightly against the opposite sides of the book, and then the table 122 is moved downward, as before described, permitting the book to be carried to the first adhesive-applying device B. This adhesive-applying device is clearly illustrated in Figs. 14 to 19. It comprises a standard 143, mounted on the table 106 and supporting a tank 144 for adhesive—such, for instance, as glue. A take-up roller 145 has its bearings in the end walls of the tank 144 and is designed to carry adhesive to the distributing-roller 146. This roller 146 has its shaft-bearings in the horizontally-disposed members of angle-arms 147, the said angle-arms being pivoted to standards 148, and the downwardly-disposed members of said angle-arms have spring connections 149 with the standards. The lower ends of the standards 148 are adjustably connected to a rock-shaft 150, having bearings in brackets 151, adjustable vertically in the upright or standard 143. As clearly illustrated in Figs. 15 and 16, the said brackets 151 at their inner ends have outwardly-extended vertical flanges engaging in undercut portions of the upright 143, and a bolt extends from the inner end of said bracket and passes through a slot in the upright, the inner end being engaged by a set-nut. This vertical adjustment of the rock-shaft is designed to regulate the throw of the distributing-roller 146 back and forth for different thicknesses of books. Each standard 148 is slotted, as at 152, at its lower end, and one wall of the slot is provided with teeth for engaging with a pinion 153, mounted on the end of the rock-shaft. It will be noted in Fig. 15 that the end of the rock-shaft is tapered and the opening through the pinion is correspondingly tapered, so that the pinion may be clamped tightly on the shaft by means of a set-nut engaging with a threaded extension of the shaft. By this means upon loosening the clamping-nut the pinion may be rotated to raise or lower the standard 148, thus bringing the upper ends in closer relation with the book to which adhesive is to be applied. When thus adjusted, the set-nut can be tightened.

Extended downward from the rock-shaft 150 is a rod 154, having a lug on its lower end engaging in the cam-channel 155 of a cam-wheel 156, mounted on a counter-shaft 157, which is driven from the main shaft through the medium of the miter-gears 158 159, respectively, on the driving-shaft and counter-shaft. The roller 145 is also driven from the counter-shaft 157. As here shown, a sprocket-chain 160 engages with a sprocket-wheel 161 on said shaft and also with a sprocket-wheel 162 on the shaft of the stationary roller. It will be noted in Fig. 16 that a portion of the cam-slot 155 is concentric with the shaft, and therefore during the movement of this portion of the slot the roller 146 will remain in connection with the roller 145 to receive adhesive therefrom and of course below the plane of the moving book $x$. The opposite sides of the slot are curved in a manner to move the distributing-roller 146 forward and back against the back of the book. At the point farthest from the axis the slot 155 has a practically straight portion, so that there can be a quick movement of the lug on the rod 154 from one side portion of the cam-slot to the other side portion.

Fig. 16 clearly illustrates the operation of the adhesive-applying roller—that is, as the cam rotates the shaft 150 will be rocked, causing the roller to engage against the back of the book at one edge and pass across the same, the springs 149 permitting the arms 147 to yield, carrying the roller along the curve of the book-back. Then as the opposite side of the cam-slot comes into operation the roller will be carried back, bearing upon the book, and thence to its normal position. These movements are clearly illustrated by the dotted lines in said Fig. 16. The book is next carried to the apparatus for applying the crash. During the movement, however, of the book from the adhesive-applying device to the crash-applying device there should be a sufficient length of time to permit the adhesive to set slightly. Therefore the space between the two devices is sufficient to permit of two or more rotations of the worm 104 before the book reaches its position over the crash-applying device, and at certain periods the carrier, as before stated, will remain stationary—that is, while the straight portion of the worm is moving relatively to the worm-wheel. This crash-applying device is illustrated in Figs. 20 to 27, and, referring thereto, 163 designates a frame mounted on the table 106. In this frame is supported a reel 164, from which the crash 165 is delivered. The crash 165 passes between feed-rollers 166 and 167, the roller 167 having its journal-bearings in blocks 168, movable in slots in standards 169 on the frame, and these blocks are pressed downward by means of springs. An intermittent feeding motion is imparted to the roller 166 by a means to be hereinafter described. The standards 169 are mounted on cross-plates on the upper ends of pillars 170, attached to the frame, and on the forward ends of these cross-plates are opposite standards 171, in which another feed-roller 172 is mounted, and above this roller 172 is a roller 173. This roller 173 is designed to be moved at a certain time toward and from the roller 172. It therefore has its shaft-bearings in arms 174, pivoted on lugs on side plates 175 on the cross-plates at the upper end of the pillars 172. At their inner ends the arms 174 are connected to rods 176, which extend downward and connect at their lower ends with arms 177, attached to a rock-shaft 178. On this rock-shaft 178 at about its center is an arm 179, arranged at substantially right angles to the arms 177. This arm 179 is designed to be engaged by an extended portion 180 on a cam-wheel 181, attached to a counter-shaft 182, driven from the main shaft through the medium of the miter-gears 183 184. Obviously when this portion 180 of the wheel 181 comes in contact with the roller on the end of the arm 179 the shaft 178 will be rocked, causing the rods 176 to swing the arms 174, moving the roller 173 upward to the position indicated in Fig. 22. The roller 172 is designed to have an intermittent rotary motion, the means for which will be hereinafter described, and in connection with the means for imparting similar motion to the roller 166. Supported by the side pieces 175 is a bed-plate 185, above which is a plate 186, the crash material being designated to pass between these two plates, as clearly indicated in Fig. 21. The said plates are provided with openings for the passage of a cutting-blade 187 for severing the strip of material from the main strip, the sharp edge of said blade 187 coacting with one edge of the opening in the plate 186. The cutter 187 is adjustably mounted on a cross-head 188, having its ends engaged with guides 189. Extended downward from the cross-head 188 are rods 190, the lower ends of which are adjustably connected to another cross head or beam 191. These rods 190 are shown as screw-threaded and engaged by nuts at the opposite side of the beam 191, so that the throw of the knife may be readily adjusted. From the beam 191 an operating-rod 192 extends downward through the table-top 106 through a bearing 193, and at its lower end it has a lug engaging in a cam-groove 194 in the cam-wheel 181. Also carried with the knife are holding-bars 195 196 for holding the material against the upper plate 186 while the knife is separating the strip. These bars are secured at their ends in the opposite members of yokes 197 and are movable through openings in the bed-plate 185, as clearly shown in Fig. 21. The yokes 197 have a slight lost-motion connection with the rods 190. As here shown, the cross members connecting the yoke members are provided with openings through which said rods pass, and springs 198 engage at their upper ends against said cross members and at their lower ends upon the beam 191. By this means and as the upper surfaces of the holding-bars 195 196 are normally on a slightly-higher plane than the upper edge of the knife or cutter as the knife or cutter is moved up the said holding devices will also be moved up to press the material against the under side of the plate 186. Then as the springs 198 yield the knife will still continue in its upward movement to sever the strip. This movement of the knife must be very quick, and therefore one side portion of the cam-slot 194 is arranged on a straight line radial to the cam-wheel. The slot is also so formed that the knife and the parts carried therewith are held stationary for a time at their lowermost position.

As before stated, the rollers 166 and 172 have an intermittent motion. While one roller is operating, however, the other roller will remain stationary—that is, the roller 166 will feed the material from the reel into the cutting device and will then remain stationary for a moment, while the other rollers operate to move the severed strip over the platens designed to press it upon the back of the book. Mounted in a frame 199, secured to the under side of the table 106 and in which the cam-wheel 181 is arranged, are shafts 200 and 201. On the end of the shaft 200 is a beveled pinion 202, meshing with a bevel-pinion 203 on a vertical shaft 204, to the upper end of which is attached a gear-pinion 205, engaging with a gear-pinion 206, mounted on the shaft of the roller 166. On the shaft 201 is a bevel-pinion 207, meshing with a bevel-pinion 208 on an upright shaft 209, to the upper end of which is attached a pinion 210, meshing with a pinion on the shaft of the roller 172. The shafts 200 and 201 are alternately operated from the shaft 182 by means of a gear-wheel 211 on said shaft and meshing with gear-wheels 212 and 213, mounted on the shafts 200 and 201. These gear-wheels 212 and 213, however, are connected to sleeves through which the said shafts loosely pass, whereby the gear-wheels may be rotated without imparting motion to the shafts 200 and 201. To cause a motion of the shafts, however, I provide each one with a clutch member 214, designed to be engaged by a clutch member 215, movable on the sleeves to which the gear-wheels are attached. Connecting with the movable clutch member for the shaft 200 is a throwing-lever 216, and connected with the movable clutch member for the opposite shaft is an operating-lever 217. These levers have inwardly-extended portions provided with lugs which engage in a peripheral channel 218, formed in the cam-wheel 181. This channel for the greater portion of the distance extends in a straight line around the wheel; but at one side it has an offset 219, as clearly indicated in Fig. 23. When the wheel rotates sufficiently to cause this offset to engage the lug of an operating or actuating lever, the said lever will be rocked to move its clutch member into engagement with the clutch member of its shaft, and thus the said shaft will be caused to rotate, consequently operating the feed-wheel. When the cam-wheel rotates sufficiently to bring said offset into engagement with the opposite operating-lever, its clutch member will be moved, causing a rotation of its shaft and a consequent rotation of the last feeding-roller to move the severed strip to position to be pressed against the back of the book. This means for pressing the material against the back of the book consists of two rocking platens 220 221, which respectively have trunnion-bearings in upwardly-extended arms 222 223, which are mounted to rock on a vertically-movable bar 224, the ends of which are provided with channeled blocks 225, the channels receiving guides 226 on the side members of a frame 227, supported on the table 106. Opposite arms 222 are connected by a cross-bar 228, while the opposite arms 223 are connected by a cross-bar 229. The outer sides of the platens 220 and 221 are connected to the arms 222 223 by means of springs 230, and during the upward movement opposite arms at the ends are moved apart by means of wedge-shaped blocks 224$^a$, attached to the top cross-bar of the frame 227. These wedges, however, may be omitted, as it is quite obvious that as the arms are moved upward and the platens pressed against the material the arms will be thereby spread; but to make the action more positive the wedges may be employed. The arms are guided in their upward movements by means of swinging angle-bars 231, the inwardly-extended upper ends of which are provided with channels to receive the webs on the outer sides of the arms, as clearly illustrated in Fig. 30. From the rod or bar 224 rods 232 233 extend downward through the table 106 and engage in cam-slots 234 in cam-wheels 235, attached to a shaft 236, mounted to rotate in hangers 237. On this shaft 236 is a gear-wheel 238, which meshes with a gear-wheel 239 on the sleeve on which the gear-wheel 213 is mounted. Therefore it will be seen that as the gear-wheel 213 is constantly rotated from the counter-shaft 182 motion will be imparted to the shaft 236. The channels 234 of the cam-wheels 235 have one straight side, as clearly illustrated in Fig. 30, so that after an upward movement of the platens they may have a quick return or downward movement. In the operation of these platens upon the rotation of the shaft 236 the cams will cause an upward movement of the arms carrying the opposite platens 220 and 221, and as they normally stand on a horizontal plane with their adjacent surfaces close together it is obvious that they will engage with the fabric at the center first, and then as the platens move upward under the operation of the cams they will spread out and wipe over the material, pressing it closely against the back of the book. The guide devices 231 are held yieldingly in engagement with the arms 222 223 by means of springs 240, connected to inwardly-extended arms at the lower ends of said guide devices and also connected to the table 106. In Fig. 28 the platens are shown in their lowermost position after having placed the crash on the book, as illustrated in the upper portion of the figure. The book is now carried to the next adhesive-applying device. (Indicated at D in Fig. 1$^a$.) This adhesive-applying device is similar in all respects to the one indicated at B and before described. Therefore it is not deemed necessary to enter into a specific description thereof excepting to state that this adhesive-applying device D applies the adhesive to the crash and also to the extended ends of the book-back at the ends of the crash, so that during the next two operations the head-bandings will be applied and then the paper cover. After leaving the adhesive-applying device D the book is carried to the device for attaching the head-bandings. In this device the head banding or bandings are formed from strips of material and then cut off in proper lengths. In this portion of the machine the head-bandings, of course, are arranged at opposite sides, each operating in a similar manner, and to accommodate the device for different lengths of books the side frames are made adjustable toward and from each other. These side frames are indicated at 241 and 242, the frame 241 being stationary on the table 106, while the frame 242 is movable with relation thereto, and to permit of these adjustments the several shafts, to be hereinafter mentioned, are made in telescopic sections. The side member 242 at its lower portion has inwardly-extended plates 243, which engage in guideways 244, attached to the table 106. At one end a screw-rod 245 passes through the frame portion 242 and is provided with an angular end to receive a turning-key, and at its threaded inner end it engages with a nut 246 on the table. At the opposite end a screw-rod 247 extends from the frame member 242 through a nut 248. As these screw-rods must be simultaneously operated to move the frame 242 inward or outward, I provide the screw-rod 245 with a bevel-pinion 249, engaging with a bevel-pinion 250 on a horizontal shaft 251, which at the opposite end has a bevel gear or pinion 252, meshing with a bevel-pinion 253 on the screw 247. In this device the first operation is to form the head-bandings for the opposite ends of the books. Therefore at opposite sides are the strips 254, which lead from suitable reels and pass through an adhesive in tanks 255. Rollers 256 are mounted to rotate in the tanks, and the strips of material pass underneath these rollers, so that the adhesive will be applied both to the inner and outer sides. From the tanks the strips pass over rollers 257, supported on the side frames, and thence to the folding devices 258, also supported on the side frames. These folding devices 258 are made in the form of tapered tubes, the openings through which gradually diminish and flatten at the outlet end, as clearly indicated in Fig. 35. Stay-cords 259 are placed within the folded edges of these strips, and these stay-cords 259 are delivered from spools 260 and pass up through centering-guides 261, over a vertical pulley 262, and thence around a horizontal pulley 263, which carries the cord to the folded edge of the material, as clearly indicated in Fig. 33. From the folding devices the strips pass between pressing-rollers 264 265, the upper one of which is mounted to yield. It is held yieldingly by means of springs 266. These rollers 264 and 265 are provided near their outer edges with annular channels to receive the enlarged portions of the strips as caused by the cords therein. From the pressing-rollers the strips are carried over tables 267, which are made adjustable as to their pitch by pivotal connection with standards in the frame members, and thence to cutting devices and to platens for forcing the head-bandings upon the book. The cutting devices for the two strips consist of blades 268, rigidly attached to horizontally-disposed members of standards 269 on the side frames, and pivoted to the fixed blades are the swinging blades 270. The swinging blade carried by the frame member 242 has at its inner end a rod 271, which extends downward through a bearing 272, extended inward from the frame member 242 and connects at its lower end with a cross-head 273, and from the other end of this cross-head a rod 274 extends upward to a connection with the swinging blade of the opposite cutter, as clearly shown in Fig. 40. To provide for a movement of the opposite cutting devices toward and from each other as the frame-section 252 is adjusted relatively to the frame-section 241, the cross-head 273 is provided with a longitudinal slot, through which a bolt passes, said bolt also passing through the lower end of the rod 271. This bolt may be provided with a suitable set-nut, so that when adjusted it may be so held.

It may be here stated that the cutting devices are operated while the strips are moving, and therefore the motion must be very quick. The means for causing the movements of the movable or swinging cutting-blade consists of a cam 275, engaged by a lug 276 on the lower end of a rod 277, extended downward from the cross-head 273 through an opening in the table 106. The cam 275 is attached to a tumbler-shaft 278, through which a shaft 279 extends. While the members 278 and 279 form practically a single shaft, it is obvious that they are made telescopic to provide for the adjustments of the machine, and as a means for holding the two members 278 and 279 rigidly together I provide on the extended end of the shaft 279 a friction-collar 280, the inner beveled edge of which is designed to engage with the beveled inner wall of an enlargement 281 on the end of the tubular shaft member 278. The cam 275 has its channel receiving the lug 276 for a greater portion of its length concentric with the axis of the cam-wheel. The other portion, however, is curved inward and then outward, the said curves being at their ends practically straight, so that quick motion is imparted to the movable blades. To regulate the time of throw of the movable blades, the cam-wheel 275 is to be adjusted relatively to a gear-wheel 282 on the shaft member 279 and meshing with a gear 279ª on the shaft 324ª. The collar 280, it will be noted in Fig. 40, is provided with a scale, so that the degree of adjustment may be readily ascertained. Upon loosening the set-nuts 283 the shaft member 279 may be rotated relatively to the cam or the cam may be rotated relatively to said gear-wheel, and then upon tightening the nuts 283 the two members of the shaft will be tightly locked together. The shaft member 279 has a bearing in a hanger 284, and on this hanger is a bearing or guide 285 for the rod 277. The strips are carried from the presser-rollers 264 265 by means of grippers consisting of fixed jaw members 286, which are continuations of horizontal rods 287, extended from a carriage 288, mounted to move lengthwise of the frame, while the other jaws 289 are pivotally connected to the lower jaws and are held yieldingly toward the same by means of springs 230. It will be noted that when in normal position the cutting-jaws will be sufficiently far apart to permit the ends of the grippers to pass between the same to grasp the head-banding strips. The carriages are movable back and forth by means of cams 290 and 291, mounted, respectively, on telescopic shaft-sections 292 293, one of these sections being provided with a feather to engage in a channel formed in the other section, so that both sections may rotate together. The section 293 is carried by the movable frame-section, while the member 292 is carried by the stationary frame-section. On the outer side of each carriage 288 is a dovetail block 294, engaging in a correspondingly-shaped channel formed in the side frame members. From each carriage 288 a pitman 295 extends rearward through a guide 296 on the frame and has a lug at its rear end engaging in the cam-channel 297 of its cam. These cams 290 and 291 are operated by a bevel-gear connection between the shaft members 292 and a vertical shaft 298, extended down through the table 106 and having at its lower end a bevel-gear 299, meshing with a bevel-gear 300 on a counter-shaft 301, on which shaft 301 is a bevel-gear 302, connecting with a bevel-gear 303 on a shaft 304, which at its inner end has a bevel-gear connection 305 306 with the main driving-shaft 105. After severing the head-banding strips the severed pieces are to be carried to the platens and then forced up against the book-back at the ends of the crash. The platens at each end are of similar construction and operate in precisely the same manner. Each pair of platens consists of plates 307 308, mounted to rock relatively to arms 309 310, which at the lower ends are mounted to swing on a vertically-operated cross-bar 311. This cross-bar has channeled blocks 312 at its ends, which channels receive the guide-ribs 213 on the frame members. These arms 309 310 are guided in their movements by devices similar to those described in connection with the first-named platens—that is, they consist of swinging arms 314 315, having grooves at the ends of their horizontally-disposed upper ends which receive ribs on the outer sides of the frames, and these arms 314 315 are held yieldingly in engagement with the platen-carrying arms by means of springs 316. The opposite arms of a side are connected by telescopic members 317 318. The opposite platen-carrying arms of a side are also connected by telescopic members 319 320, permitting of the adjustment of the platens toward and from each other as the movable frame-section is adjusted. From the rod or bar 311, which also consists of two telescopic sections, pitmen or rods 321 322 extend downward and engage in cam-channels 323 in cam-wheels 324 325, these cam-channels being substantially ovate, one side of the cam-groove operating to move the platens downward, while the other side of the cam-groove moves the same upward. The cam 324 is mounted on a shaft 324$^a$, and the cam 325 is mounted on a tubular shaft 325$^a$, in which the shaft 324$^a$ is longitudinally movable; but the shafts are connected to rotate together and, in fact, constitute a single shaft. The part 325$^a$ has at its outer end a flange 325$^b$, held in a casing 325$^c$. This shaft is driven from the shaft 301 through the medium of gears 301$^a$ 301$^b$.

By referring particularly to Fig. 49 it will be noted that the platens not only have a rocking motion with relation to their carrying-arms, but they have means for locking the platens in tilted position after operating to press the head-bandings on the book and retaining them in said locked position while moving away from the work, so as to prevent a return of said platens to normal position while releasing themselves from the work, which might cause a rubbing and possible scraping off of the head-bandings. As here shown, each platen member is mounted on a short shaft 326, which extends loosely through its arm, and arranged between the arm and the outer end of the platen is a spring 327, which serves to press the platen outwardly with relation to the arm and against a plate 328, extended upward and having at its upper end a transverse guide-rod 329, the inner surfaces of which at the ends are curved outward, so that during the operation of moving a book over the platens the same will be guided straight thereon, as clearly indicated in Fig. 39. These plates 328 are movable inward and outward with a yielding motion. Each plate has a pin 330 extending loosely through an opening in a standard 331, and at its top it also has a pin 332 extended through the opening at the top of the standard. This pin 332 may be made angular in cross-section, if desired, and it is provided with a head at the outer end to prevent the plate 328 from moving too far inward when not engaged by a book or by the platens. The plate is pressed inward by means of a spring 333, surrounding the pin 332 and engaging at one end against the standard 331 and at the other end against the plate 328. Supported on the short shaft 326, so as to rotate therewith, but through which the shaft may have a longitudinal movement, is a ratchet 334, which to prevent endwise movement is placed within a boxing 325 on the arm. The shaft is shown as provided with a feather 336 for engaging in a channel in the ratchet. Adapted for engagement with the ratchet is a locking-pawl 337, which is held in yielding engagement with the ratchet by means of a spring 338, attached at its upper end to the outwardly-extended member of the pawl and at its lower end to a pin extended from the arm. Upon the extreme downward movement of the platens the pawl is to be released from its locking engagement with the ratchet, so that the platen may be returned to normal position by means of its spring 339, connecting at one end with the platen and at the other end with a pin extended from the arm. For this means a tappet-finger 340 is mounted on each guide-arm 314, so as to swing therewith, as clearly indicated in Fig. 43. Upon reaching position on the platens the head-bandings are to be released by the grippers. Before said releasing, however, the head-bandings must be held so that there will be no possibility of moving them out of position upon further movement of the gripping devices. This temporary holding means consists of a rod 341, mounted to swing horizontally on the machine-frame and to engage its inner end against the edge (here shown as the cord edge) of the head-banding, as indicated in Fig. 57. This rod is spring-yielding, and as it moves inward it enters a downwardly-curved groove 342 in the plate 328, the said groove being clearly indicated in Fig. 54. The lower portion of this groove is substantially in horizontal line with the top surface of the head-banding. The normal position of the holding device 341 is at substantial parallelism with the frame, and to return it to such position after its operation with the head-banding I employ a spring 343, connected at one end to the holding finger or rod and at the other end with the frame. Carried by the carriage 288 is a forwardly-extended arm consisting of two sections 344 and 345, which have a rule-joint. The section 345 is held in parallelism normally with the section 344 by means of a spring 346, and the end of said member 345 is provided with an inwardly-extended lug or hook 347 for engaging with the outwardly-projected end of the holding-finger 341. The gripping device or the movable jaw thereof has a rearward extension 348, having a laterally-disposed lug on which is mounted a roller 349, which is adapted to pass over the upper side of a longitudinally-disposed spring-yielding track 350 to engage with an incline or cam 351, supported by a standard 352, this incline 351 being at the extreme rear end of the track 350. As the carriage moves rearward and as the roller 349 approaches the inclined surface 351 the holding-finger 341 will be moved in position, and then the roller 349 will engage with said inclined surface 351, which obviously will rock the jaw member 289, and thus release the strip of material. The carriage, however, must still continue its movement to free the gripping device, or rather to move the gripping device out of the line of upward movement of the platens, as shown in Fig. 56. During this further movement the roller 349 will force the yielding track 350 downward, allowing said roller to pass between it and a horizontal plate 353, which is practically a continuation of the incline 351. Then upon the return movement of the carriage the roller 349 will engage against the under side of the track 350, holding the jaw open until the roller reaches the forward end of said track and the jaw is in position for grasping a new strip or piece of head-banding. Then as the roller passes off the end of said track the spring 230 will cause the movable jaw to move downward and grasp the material, as indicated in Fig. 50.

When the head-banding is on the platens, as indicated in Figs. 55 and 57, the platens are to be moved upward by the mechanism heretofore described, carrying the head-bandings against the book-back at the ends of the webbing, and then by a continued upward movement of the platens they will be spread apart either by means of their abrading connection with the head-bandings or by means of wedges 354, supported from the main-frame member. After wiping the head-bandings in position the platens start on their downward movement and are held first tilted by the means heretofore described; but upon reaching their lowermost position the outwardly-disposed members of the locking-pawls will engage with the tappets and release the locking devices, permitting the platens to move to their normal position. After placing the head-bandings on the book the book is carried to the mechanism for applying the paper lining. This mechanism is shown in Figs. 58 to 67. The paper lining 348 is fed from a reel through a tank 349, containing glue or other suitable adhesive, and is guided through the adhesive by means of a roller 350. The paper then passes between guide-rollers 351 and 352, the upper one of which has its bearings in slots formed in standards 303, supported on the frame 354. The said upper roller is held yieldingly against the paper by means of springs 355. From the rollers the paper passes over an adjustable table 356 to a cutting device, consisting of a fixed blade 357 and a movable blade 358, the blade 358 being pivotally connected to the arm 359, supporting the fixed blade, this arm 359 being attached to the frame. A pitman or draw-rod 360 extends from the rear portion of the blade 358 through an opening in the table 106, and on the lower end of said pitman or rod is a lug engaging in the cam-channel 361 of a cam-wheel 362, attached to a shaft 363. The rod 360 is preferably made, as shown in Fig. 62, in two sections pivotally connected together, and a spring 364 is connected at its upper end to an arm extended from the upper portion of said rod and at its lower portion to a table 106, this spring serving to make a quick cutting movement of the movable blade. The cam-slot 361 for its greater portion is concentric with the shaft; but at one side it has a practically straight portion which permits of a quick movement of the blade after severing the strip of material. The shaft 363 to which the cam is attached is made tubular and surrounds a driving-shaft 365, the object being to provide for an adjustment of the cam for a greater or less throw of the cutting-blade. The shaft-section 363 is provided at its end with a ring 366, having a tapered inner portion engaged by a collar 367, which is held in position by clamping-nuts 368. This collar 367 is graduated, so that the proper adjustments may be made. The shaft 365 is driven from the main shaft 105 through the medium of bevel-gears 369 370, connecting, respectively, with the shafts 380 and 105, as clearly shown in Fig. 1$^b$. The strip of paper is drawn to the cutting device and the severed strip is carried therefrom to the platens by means of a gripper consisting of a stationary jaw 371, attached to an arm 372, mounted on a carriage 373, movable lengthwise of the frame. Coacting with the fixed jaw 371 is a movable jaw 374, which is held in gripping position by means of a spring 375. The carriage carrying the gripping device is operated by a rod or bar 376, having a slot at its upper end into which a lug on the carriage passes. The lower portion of this bar 376 is pivoted to the frame of the machine, and connecting with said bar is a longitudinally-movable bar 377, which slides in a guide 378, and is operated by a cam 379, attached to a shaft 380, which is driven from the shaft 365 through the medium of bevel-gears 381 382. The jaw 374 has a rearward projection 383, on a lateral stem of which is mounted a roller 384, which during the backward movement of the gripper carrying the strip of severed paper moves over a track 385, and upon reaching the rear end of said track the roller by engaging with an inclined plate 386 moves the jaw to open position, thus releasing the paper and leaving it on the platens, to be hereinafter described. After releasing the paper the gripping device has a still further movement underneath a horizontal plate 387, which is a continuation of the incline 386, and then upon a forward movement of the gripping device the roller passes along and engages against the under side of the spring-yielding track 385 until it reaches the end, when the movable jaw 374 is moved into gripping connection with the strip of paper by means of the spring 375.

The platens for placing the back-lining consist of swinging plates 388 and 389, attached to arms 390 and 391, which extend downward and connect with a cross head or bar 392, having channeled blocks 393 at its ends in which guide-rails 394 engage. Guide-arms 395 396 are provided for the arms 390 391. These guide-arms have channels or grooves at the ends of their horizontally-disposed upper portions in which webs on the arms engage, and the said arms 395 396 are held yieldingly in engagement with the first-named arms by means of springs 397. From the bar 392 rods 398 extend downward through openings in the table 106, and the lower ends of these rods are provided with lugs which engage in the cam-grooves 399 of cam-wheels 400. These cam-grooves 399 are for a portion of their length concentric with the shaft upon which the cams are mounted. The opposite sides, however, are curved outward and then inward, so as to cause the up and down movements of the platens.

In operation when the platens are moved upward, carrying the strip of paper, the paper is pressed against the back of the book located over the platens, and during this operation the platens are spread apart either by their friction against the material or by wedges 401, attached to a frame 402. After leaving the device for applying the paper lining the book is carried to the discharge-table G, and the jaws are released therefrom by means of a separating device similar in all respects to that shown in Fig. 13. The separating device is operated by a cam 403, mounted on the main shaft 105.

It will be seen that in this machine the several devices are operated in unison, and it is to be understood that any number of carriers may be employed. By using the term "crash" I intend to cover any material that may be substituted therefor—such, for instance, as cotton cloth, linen, or paper.

While I have hereinbefore stated that the main shaft 105 is driven by a direct band connection therewith, it is preferably operated to reduce speed by means of a gear-wheel 404 engaging with a pinion 405, mounted on a shaft 406, to which the fast and loose pulleys 407 408 are attached.

Having thus described my invention, I claim as new and desire to secure by Letters Patent—

1. In a bookbinding-machine, devices operating successively to place on a book-back the crash, the head-banding and the lining, all of said devices having flat operating-surfaces and a smoothing or rubbing action and means for transferring the work from one device to another.

2. In a bookbinding-machine, laterally-sliding mechanism for applying crash, laterally-sliding mechanism for applying head-bandings, and laterally-sliding mechanism for applying lining, the said mechanisms operating in unison and receiving the work in succession, each of said mechanisms having a flat operating-surface.

3. A bookbinding-machine having devices in the following succession: an adhesive-applying device, a crash-applying device comprising oppositely-moving platens having flat rubbing-surfaces, an adhesive-applying device, a head-banding-applying device, and a lining-applying device comprising oppositely-moving platens having flat rubbing-surfaces.

4. A bookbinding-machine having devices in the following succession: an adhesive-applying device, a crash-applying device comprising oppositely-moving platens having flat rubbing-surfaces, a second adhesive-applying device, a head-banding-applying device comprising oppositely moving and rocking platens having flat rubbing-surfaces, and a lining-applying device comprising oppositely-moving platens having flat rubbing-surfaces, means for operating the several devices in unison, and a carrier for moving the books from one device to another.

5. In a bookbinding-machine, laterally-sliding mechanism for applying crash, laterally-sliding mechanism for applying head-bandings, laterally-sliding mechanism for applying lining, the said mechanisms having flat rubbing-surfaces, a driving-shaft with which the several mechanisms are geared, and a carrier for a plurality of books and operating to move the books successively to the different mechanisms.

6. In a bookbinding-machine, devices for applying crash, devices for applying head-bandings, devices for applying a lining, each of said devices comprising laterally-movable platens having flat rubbing-surfaces, a main shaft, connections between said shaft and the several devices, a vertical shaft having worm connection with the main shaft, and a book-carrier mounted on said vertical shaft.

7. In a bookbinding-machine, a plurality of pairs of laterally-movable rocking platens having flat rubbing-surfaces for operating upon a book-back, a main shaft operating said mechanisms, a carrier rotated by said main shaft, a plurality of holding-jaws on said carrier, means for moving said jaws in parallelism, and means operated by the machine for spreading the jaws.

8. A bookbinding-machine, comprising a succession of devices consisting of pairs of laterally-movable rocking platens for applying crash, head-bandings and lining, a carrier mounted to rotate for transferring the books successively to the said devices, and book-holding devices on the carrier, consisting of jaws for engaging opposite sides of the book, crossed jaws pivotally connected together and attached to the first-named jaws, rods mounted to swing on the carrier, sleeves movable on said rods and having connection with the inwardly-extended ends of the last-named jaws, and springs for moving said sleeves toward each other.

9. In a bookbinding-machine, a series of devices having flat rubbing-surfaces for applying with a rubbing or smoothing motion crash, head-bandings and linings, means for imparting motion to the several devices in unison, a rotary carrier, holding-jaws on said carrier, means for forcing the jaws toward each other, and a spreader operated by the machine for separating the jaws.

10. In a machine of the character described, an adhesive-applying device, comprising a tank for the adhesive, a roller mounted to rotate in said tank, a distributing-roller, a vertically-adjustable rock-shaft, standards adjustable on said rock-shaft, angle-arms pivoted to the standards and supporting the distributing-roller, spring connections between the angle-arms and the standards, a rod extended downward from the rock-shaft, and a cam with which said rod engages.

11. In a machine of the character described, an adhesive-applying device, comprising a tank, a roller mounted to rotate in the tank, a spreading-roller for engaging with the first-named roller, brackets adjustable vertically on the support for the tank, a rock-shaft having bearings in said brackets, pinions adjustable on the ends of said rock-shaft, standards having slots at the lower ends, a wall of each slot being provided with a rack for engaging with a pinion, arms mounted to swing on the standards and having connection with the spreading-roller, and a cam for moving the rock-shaft.

12. In a machine of the character described, a crash-applying device comprising feed-rollers, a table over which the crash is movable, holding devices for pressing the crash against a book, a cutter operating with the said pressing devices, swinging platens receiving a severed strip of crash, and means for operating the platens for forcing the strip against the book-back.

13. In a machine of the character described, a crash-applying device, comprising a bed-plate and a plate arranged above the bed-plate, means for feeding crash between said two plates, the said plates being provided with openings, a cutter movable through the openings, pressing devices carried with the cutter, rollers at the outlet end of said plates, means operated by the machine for swinging the upper one of said rollers upward and downward, platens arranged adjacent to said rollers, and means for moving the platens upward to press material against a book.

14. In a machine of the character described, a crash-applying device, comprising a bed-plate and a plate arranged above the bed-plate, said plates being provided with openings, a cutter movable in said openings, a rod extended from said cutter, a cam with which the rod connects, pressing devices carried by said rod and having yielding connection therewith, platens for pressing the crash against a book, and means for carrying a strip of material to said platens.

15. In a machine of the character described, a crash-applying device comprising a bed-plate, a plate arranged above the bed-plate, means for moving the crash between said two plates, means for cutting the crash supported between the plates, rollers at the outlet end of said plates, the upper one of said rollers being mounted to swing, means operated by the machine for swinging said roller, a reel for crash, feed-rollers for carrying the crash from the reel to said plates, pressing-platens forward of the plates, and means for moving said platens upward and downward.

16. In a machine of the character described, a pair of platens, arms on which the opposite platens are mounted to swing, spring connections between the arms and the platens, a rod on which said arms are mounted to swing, a cam for imparting vertical motion to the rod, and swinging guide-arms engaging with the first-named arms.

17. In a machine of the character described, a pair of platens, arms on which said platens are mounted to swing, a vertically-movable rod on which said arms are mounted to swing, a cam for moving the rod vertically, arms having horizontally-disposed portions provided with channels to engage over webs on the first-named arms, and springs for holding the last-named arms yieldingly in engagement with the first-named arms.

18. In a machine of the character described, means for feeding crash, means for severing a strip of crash from the main strip, a pair of platens for receiving material from the severing device, means for moving the material to said platens, arms on which the platens are mounted to rock, spring connections between the outer sides of the platens and the arms, a vertically-movable rod on which the arms are mounted to swing, spreading wedges for the arms, and a cam for imparting vertical motion to the rod.

19. In a machine of the character described, a pair of platens consisting of bars, arms on which the platens are mounted to swing, spring connections between said platens and the arms, a vertically-movable rod on which the arms are mounted to swing, guide-rails for said rod, an operating-shaft, cams mounted on said shaft, and connections between said cams and the rod.

20. In a machine of the character described, a pair of platens, arms on which said platens are mounted to rock, springs for moving the platens in one direction, a vertically-movable rod with which the arms have a swinging connection, means for spreading the arms upon upward movement, means for moving the arms toward each other upon downward movement, and means for imparting vertical movements to said rod.

21. In a machine of the character described, a head-banding-applying device, comprising formers for the head-bandings, pressing-rollers at the outlet ends of the formers, cutters for severing head-banding strips, platens for applying the bandings to a book, and means for moving the bandings from the cutter to said applying means.

22. In a machine of the character described, a head-banding-applying device, comprising a tank for adhesive, means for folding strips of material to form the bandings, means for applying cords to the bandings, means for severing the bandings from the strips, and means for pressing the bandings upon a book-back.

23. In a machine of the character described, a head-banding-applying device, comprising formers consisting of conical tubes having flattened and reduced outlets, means for carrying strips of material through said formers, cutters for severing bandings from the strips, swinging platens for applying the bandings, means for operating said platens, and movable grippers for carrying strips of material to the platens.

24. In a machine of the character described, a device for applying head-bandings, comprising means for folding or forming the bandings, cutting devices operated by the machine, swinging platens forward of the cutting devices, carriages movable relatively to the platens, gripping devices mounted on the carriages, and cams for moving the carriages.

25. In a machine of the character described, a head-banding-applying device, comprising two pairs of swinging platens, means for moving said platens upward and downward, and means for carrying strips of material to the platens.

26. In a machine of the character described, the head-banding-applying platens consisting of bars or blocks, arms supporting said platens, a rod on which the arms are mounted to swing, means for moving said rod upward and downward, shafts extended from the platens through said arms, and means for locking said shafts in the arms.

27. In a machine of the character described, a head-banding former comprising a tapered tube flattened at its outlet end, means for moving material through the tube, a spool for delivering cord, and rollers arranged at right angles to each other at the inlet end of the tube for directing cord to the middle of the strip of material, one of said rollers being in the plane of the flattened end of said tube and having one edge substantially tangent to the side line of the tube, substantially as specified.

28. In a machine of the character described, in combination with a device for applying crash to a book, a head-banding-applying device, comprising formers for the head-bandings, means for applying adhesive to the bandings, means for severing strips of bandings, and means for pressing the bandings against the book.

29. In a machine of the character described, the combination with devices for applying crash to a book, of means for applying head-bandings to the book, the said means comprising devices for folding the material to form the bandings, means for applying adhesive before the folding, means for directing cords into the folded bandings, and means for pressing the bandings against the book.

30. In a machine of the character described, a head-banding-applying device, comprising a frame, one side being adjustable relatively to the other side, a telescopic rod movable in the frame members, cams for moving the said rod upward and downward, arms mounted to swing on said rod, opposite arms having telescopic rod conections, and platens mounted to swing on the arms.

31. In a machine of the character described, a head-banding-applying device, comprising a frame, the side members of which are adjustable one relatively to the other, a telescopic rod mounted to slide in said frame, means for causing the movements of said rod, two pairs of arms mounted to swing on the rod, platens mounted to swing on the arms, means for spreading the arms upon upward movement, and locking devices for locking the platens in tilted relation to the arms upon downward movement.

32. In a machine of the character described, a device for applying head-bandings, comprising pairs of vertically-movable platens, the said platens being mounted to swing, means for moving the platens vertically, spring yielding plates with which the outer ends of the platens engage, and guide-bars on the upper ends of said plates.

33. In a machine of the character described, a head-banding-applying device, comprising vertically-movable arms, a rod on which the arms are mounted to swing, platens mounted to swing on the arms, spring connections between the platens and arms for swinging the platens in one direction, shafts extended from the platens through openings in the arms, springs between the arms and the platens, said springs surrounding the shafts, locking devices carried by the arms for securing the shafts in one position, and means for causing vertical movements of the arms.

34. In a machine of the character described, a head-banding-applying device comprising platens, arms on which said platens are mounted to swing, a cross-bar on which the arms swing, telescopic members connecting arms of opposite sides, a driving-shaft consisting of telescopic sections, the said bar being also telescopic, cams on said shaft, and connections between said cams and the bar.

35. In a machine of the character described, in connection with head-banding-applying devices, cutters comprising fixed blades and swinging blades, frames in which said blades are mounted, one frame being adjustable relatively to the other frame, a cross-head, rod connections between the swinging blades and said cross-head, one of said rods having adjustable connection with the cross-head, a shaft, a cam on said shaft, a connection between the cam and the cross-head, and means for adjusting the cam.

36. In a machine of the character described, a device for affixing head-bandings, comprising frame members, one member being adjustable relatively to the other member, screw-rods connecting with the ends of said adjustable member, gear connections between said screw-rods, a rod consisting of telescopic sections and having sliding connection with the frame members, means for causing vertical movements of said rod, and swinging platens carried by the rod.

37. In a bookbinding-machine, a device for applying head-bandings, comprising a vertically-movable rod, means for causing the movements of said rod, arms mounted to swing on the rod, platens having swinging connection with the arms, locking devices for the platens, means for releasing said locking devices on a downward movement of the platens, and spring-held swinging arms engaging with the first-named arms.

38. In a machine of the character described, the head-banding-cutting devices, comprising fixed blades and swinging blades, a cross-head with which the swinging blades are connected, a shaft, a tubular shaft on the first-named shaft, a cam on the tubular shaft and having connection with the cross-head, the said tubular shaft having an enlarged outer end provided with a recess, and a graduated collar on the first-named shaft and engaging in said recess.

39. In a bookbinding-machine, a device for applying head-bandings, comprising a frame, carriages movable on the frame, means for causing the movements of the carriages, gripping devices mounted on the carriages, each gripping device having a swinging jaw member, inclined plates for swinging said jaws on a rearward movement thereof, and spring-yielding tracks with which said jaws are designed to engage.

40. In a bookbinding-machine, a device for applying head-bandings, comprising a frame, cutters operating in said frame, carriages movable in the frame, gripping devices supported on the carriages, means for moving the carriages, means for releasing the gripping devices, holding-fingers mounted to swing, platens for pressing material against a book and over which said fingers are designed to pass, and means mounted on the carriages for moving said fingers to holding position.

41. In a bookbinding-machine, a device for applying head-bandings, comprising a frame, carriages movable in the frame, swinging platens movable vertically with relation to the frame, means for causing the vertical movements of the platens, cutting devices, and means mounted on the carriage for moving material from the cutting devices to the platens.

42. In a bookbinding-machine, a frame, carriages mounted to move in the frame, cams for causing the movements of said carriages, platens movable vertically in the frame, cams for moving said platens vertically, cutting devices supported in the frame, and means mounted on the carriage for moving material from the cutting devices to the platens.

43. In a bookbinding-machine, a device for applying head-bandings, comprising a frame, an adhesive-tank at one end of the frame, a roller operating in said tank, formers for receiving material from the tank, pressing-rollers at the outlet ends of the formers, cutting devices forward of the pressing-rollers, platens movable vertically in the frame, carriages movable in the frame, means for causing the movements of said carriages, and grippers mounted on the carriages.

44. In a bookbinding-machine, a device for applying lining to the back of books, comprising a frame, a carriage movable in the frame, means for moving said carriage, a gripper mounted on the carriage, means for releasing the gripper from material, a cutting device at the outlet end of the frame, feeding-rollers adjacent to said cutting device, and platens movable in the frame.

45. In a bookbinding-machine, a device for applying linings, comprising a frame, a carriage movable in the frame, a swinging rod connecting with said carriage, a cam, a connection between the cam and said rod, gripping-jaws mounted on the carriage, one of said jaws being mounted to swing, a spring-yielding track, a laterally-extended roller on the swinging jaw for passing over the track, and an inclined plate at the free end of the track with which said roller is designed to engage to swing the jaw to open position.

46. In a bookbinding-machine, a device for applying paper linings, comprising a frame, a cutting device operating in the frame, a rod movable vertically in the frame, cams for moving said rod, arms mounted to swing on the rod, and platens mounted to swing on said arms.

47. In a bookbinding-machine, a device for applying paper linings, comprising a frame, a cutting device in the frame, a rod movable vertically in the frame, arms mounted to swing on said rod, cams for causing the vertical movements of the rod, platens mounted to swing in the arms, and means operated by the machine for moving material from the cutter to the platens.

48. In a bookbinding-machine, a device for applying paper linings, comprising a frame, a cutting device at the inlet end of the frame, a rod movable vertically in the frame, cams for causing said vertical movements, a carriage movable in the frame, a cam for operating said carriage, a gripper carried by the carriage, platens movable with the rod in the frame, an adhesive tank, and a roller operating in said tank.

49. In a bookbinding-machine, platens for pressing head-bandings on a book, swinging holding-fingers, a carriage, gripping devices mounted on the carriage, arms attached to the carriage and consisting of two sections hinged together, the free end of each arm being provided with a hook for engaging with the holding-fingers, the said fingers being of yielding material, and plates having slots or recesses curved longitudinally to press the fingers against the material.

In testimony whereof I have signed my name to this specification in the presence of two subscribing witnesses.

WILLIAM EDGAR BLAUVELT.

Witnesses:
CHAS. MILLER,
ALEXANDER BAUER.